United States Patent
Paiz

(10) Patent No.: US 8,977,621 B1
(45) Date of Patent: Mar. 10, 2015

(54) SEARCH ENGINE OPTIMIZER

(71) Applicant: Richard Paiz, N. Miami Beach, FL (US)

(72) Inventor: Richard Paiz, N. Miami Beach, FL (US)

(*) Notice: Subject to any disclaimer, the term of this patent is extended or adjusted under 35 U.S.C. 154(b) by 86 days.

(21) Appl. No.: 13/777,775

(22) Filed: Feb. 26, 2013

Related U.S. Application Data

(63) Continuation-in-part of application No. 13/247,964, filed on Sep. 28, 2011, now Pat. No. 8,868,535, which is a continuation-in-part of application No. 12/785,122, filed on May 21, 2010, now Pat. No. 8,386,456, which is a continuation-in-part of application No. 12/146,420, filed on Jun. 25, 2008, now Pat. No. 7,908,263, and a continuation-in-part of application No. 12/778,228, filed on May 12, 2010, now Pat. No. 8,239,229, which is a continuation-in-part of application No. 12/764,934, filed on Apr. 21, 2010, now Pat. No. 8,676,667, and a continuation-in-part of application No. 11/584,941, (Continued)

(51) Int. Cl.
*G06F 7/00* (2006.01)
*G06F 17/30* (2006.01)

(52) U.S. Cl.
CPC .................... *G06F 17/3087* (2013.01)
USPC .......................... 707/738; 707/766

(58) Field of Classification Search
CPC .................. G06F 17/30864; G06F 17/30867
USPC ................. 707/737, 738, 740, 765, 766, 767
See application file for complete search history.

(56) References Cited

U.S. PATENT DOCUMENTS

| | | | |
|---|---|---|---|
| 5,025,369 A | 6/1991 | Schwartz | |
| 5,063,506 A | 11/1991 | Brockwell et al. | |
| 5,585,839 A | 12/1996 | Ishida et al. | |
| 5,671,363 A | 9/1997 | Cristofich et al. | |
| 5,762,552 A | 6/1998 | Vuong et al. | |
| 5,790,935 A | 8/1998 | Payton | |
| 5,794,210 A | 8/1998 | Goldhaber et al. | |
| 5,809,282 A | 9/1998 | Cooper et al. | |
| 5,819,258 A * | 10/1998 | Vaithyanathan et al. | 707/692 |
| 5,832,069 A | 11/1998 | Waters et al. | |
| 5,873,099 A | 2/1999 | Hogan et al. | |
| 5,878,113 A | 3/1999 | Bhusri | |
| 5,878,127 A | 3/1999 | Fleischer, III | |
| 5,881,269 A | 3/1999 | Dobbelstein | |
| 5,910,981 A | 6/1999 | Bhagat et al. | |
| 5,917,899 A | 6/1999 | Moss et al. | |
| 5,931,901 A | 8/1999 | Wolfe et al. | |
| 6,028,924 A | 2/2000 | Ram et al. | |
| 6,069,310 A | 5/2000 | James | |
| 6,078,657 A | 6/2000 | Alfieri et al. | |

(Continued)

FOREIGN PATENT DOCUMENTS
EP 0448800 A1 10/1991

OTHER PUBLICATIONS
Robertson, et al. "Cone Trees: Animated Visualization of Hierarchical Information", 1991, 6 pp.

(Continued)

*Primary Examiner* — Marc Somers
(74) *Attorney, Agent, or Firm* — Allen D. Hertz, P.A.; Allen D. Hertz

(57) ABSTRACT

A search engine optimizer that works independently and in parallel with a browser and search engine supercomputer to gather, analyze, and distill input information interactively. The optimizer reorganizes the input, and provides an optimized version as an output. The optimized version of the input (e.g. output) is sent to the search engine, which responds to the end user with search results. The optimizer recognizes each request as a pattern and stores the pattern in an advanced Glyph format. This permits the optimizer to identify a left and right side human brain checkmate combination required to achieve certitude.

16 Claims, 20 Drawing Sheets

Related U.S. Application Data filed on Oct. 23, 2006, now Pat. No. 7,809,659, which is a continuation-in-part of application No. 10/852,394, filed on May 24, 2004, now abandoned, said application No. 12/778,228 is a continuation-in-part of application No. 10/926,267, filed on Aug. 25, 2004, now abandoned, which is a continuation-in-part of application No. 10/603,963, filed on Jun. 25, 2003, now Pat. No. 6,842,511, said application No. 12/778,228 is a continuation-in-part of application No. 10/926,446, filed on Aug. 25, 2004, now Pat. No. 7,050,813, said application No. 10/603,963 is a continuation-in-part of application No. 09/544,238, filed on Apr. 7, 2000, now Pat. No. 6,614,893, said application No. 12/778,228 is a continuation-in-part of application No. 09/514,940, filed on Feb. 28, 2000, now Pat. No. 7,058,601, said application No. 12/785,122 is a continuation-in-part of application No. 11/223,226, filed on Sep. 9, 2005, now abandoned, which is a continuation-in-part of application No. 10/135,493, filed on Apr. 30, 2002, now abandoned, said application No. 12/785,122 is a continuation-in-part of application No. 11/584,271, filed on Oct. 20, 2006, now abandoned, and a continuation-in-part of application No. 11/085,678, filed on Mar. 21, 2005, now abandoned, which is a continuation-in-part of application No. 09/819,174, filed on Mar. 27, 2001, now abandoned.

(60) Provisional application No. 60/184,537, filed on Feb. 24, 2000, provisional application No. 60/289,033, filed on May 4, 2001, provisional application No. 60/193,160, filed on Mar. 28, 2000.

(56) References Cited

U.S. PATENT DOCUMENTS

| | | |
|---|---|---|
| 6,088,733 A | 7/2000 | Kikuchi |
| 6,128,378 A | 10/2000 | Diener et al. |
| 6,219,652 B1 | 4/2001 | Carter et al. |
| 6,243,480 B1 | 6/2001 | Zhao et al. |
| 6,256,627 B1 * | 7/2001 | Beattie et al. ............ 707/6 |
| 6,264,560 B1 | 7/2001 | Goldberg et al. |
| 6,282,653 B1 | 8/2001 | Berstis et al. |
| 6,330,672 B1 | 12/2001 | Shur |
| 6,345,182 B1 | 2/2002 | Fabritius et al. |
| 6,363,253 B1 | 3/2002 | Valentine et al. |
| 6,408,282 B1 | 6/2002 | Buist |
| 6,427,132 B1 | 7/2002 | Bowman-Amuah |
| 6,442,169 B1 | 8/2002 | Lewis |
| 6,445,785 B1 | 9/2002 | Chan et al. |
| 6,463,275 B1 | 10/2002 | Deakin |
| 6,490,345 B2 | 12/2002 | Fleischer et al. |
| 6,508,709 B1 | 1/2003 | Karmarkar |
| 6,510,419 B1 | 1/2003 | Gatto |
| 6,529,592 B1 | 3/2003 | Khan |
| 6,529,878 B2 | 3/2003 | De Rafael et al. |
| 6,601,044 B1 | 7/2003 | Wallman |
| 6,614,781 B1 | 9/2003 | Elliott et al. |
| 6,629,890 B2 | 10/2003 | Johnson |
| 6,661,884 B2 | 12/2003 | Shaffer et al. |
| 6,915,268 B2 | 7/2005 | Riggs et al. |
| 6,947,540 B2 | 9/2005 | Madoch et al. |
| 7,006,988 B2 | 2/2006 | Lin et al. |
| 7,059,515 B2 | 6/2006 | White |
| 7,103,536 B1 | 9/2006 | Kanno |
| 7,499,914 B2 | 3/2009 | Diab et al. |
| 7,552,395 B2 | 6/2009 | Neale et al. |
| 7,660,815 B1 | 2/2010 | Scofield et al. |
| 7,725,465 B2 | 5/2010 | Liao et al. |
| 7,756,850 B2 | 7/2010 | Keith, Jr. |
| 7,890,526 B1 * | 2/2011 | Brewer et al. ............ 707/767 |
| 2002/0049622 A1 | 4/2002 | Lettich et al. |
| 2002/0137217 A1 | 9/2002 | Rowe |
| 2003/0018547 A1 | 1/2003 | Steele |
| 2003/0050819 A1 | 3/2003 | Koenigbauer et al. |
| 2004/0024739 A1 * | 2/2004 | Copperman et al. ............ 707/1 |
| 2005/0114324 A1 | 5/2005 | Mayer |
| 2005/0165753 A1 * | 7/2005 | Chen et al. ............ 707/3 |
| 2006/0242098 A1 * | 10/2006 | Wnek ............ 706/45 |
| 2007/0050393 A1 * | 3/2007 | Vogel et al. ............ 707/102 |
| 2008/0168033 A1 * | 7/2008 | Ott et al. ............ 707/3 |
| 2008/0195477 A1 * | 8/2008 | Kennedy et al. ............ 705/14 |
| 2009/0100125 A1 | 4/2009 | McDowell |
| 2010/0017267 A1 | 1/2010 | Negron |
| 2011/0125743 A1 * | 5/2011 | Immonen et al. ............ 707/737 |
| 2011/0145088 A1 | 6/2011 | Bonner et al. |

OTHER PUBLICATIONS

Hearst, et al. "Cat-a-Cone: An Interactive Interface for Specifying Searches and Viewing Retrieval Results using a Large Category Hierarchy", 1997, 10 pp.
Zamir, et al. "Grouper: A Dynamic Clustering Interface to Web Search Results", 1999, 15 pp.
Dumais, et al. "Hierarchical Classification of Web Content", 2000, 8 pp.
Wen, et al. "Clustering User Queries of a Search Engine", 2001.
Unknown, American Banker, "Chemical Buys Trading Software from Reuters", ( v 154, n. 145, p. 14, Dialog file 9, Accession No. 00500233), 1994.
Croneliusson, Roy, SAP-R3, Jan. 1999. Downloaded from https:llqupea.ub.gu.se/dspace/bitstream/2077/1359/1/hattab.IA7400.pdf downloaded on Mar. 26, 2008, 47 pages.
SAP-CAPS, 1999. Downloaded from http://web.archive.org/web/19991105101002/www.caps.com/products/sap/sapr3.htm, 3 Pages.
RoutePro, 1999, Downloaded from http://web.archive.org/web/20010627035933/www.caps.com/products/rprodsgrfrpdsgrfeat.htm, 2 pages.

* cited by examiner

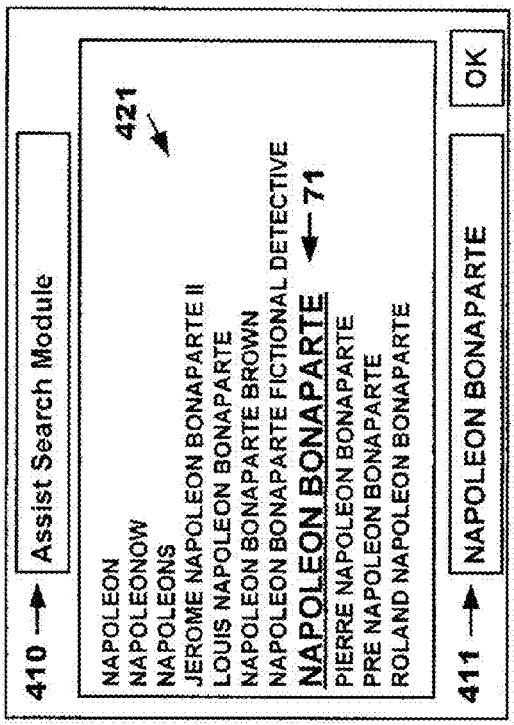
FIG. 9A
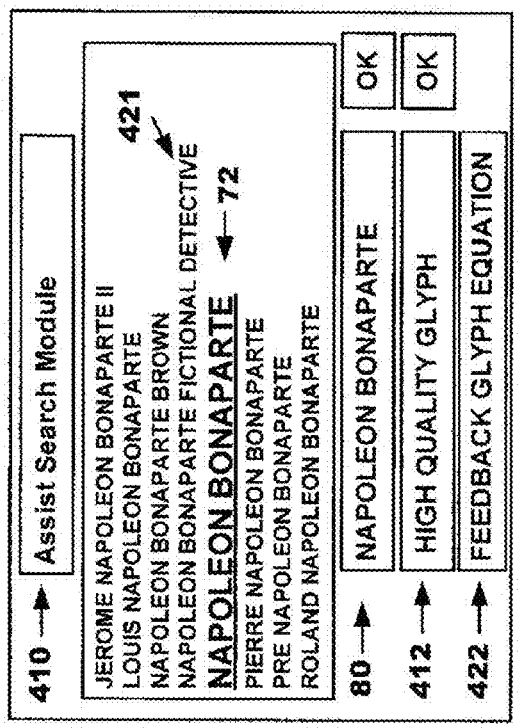
FIG. 9B
FIG. 9C
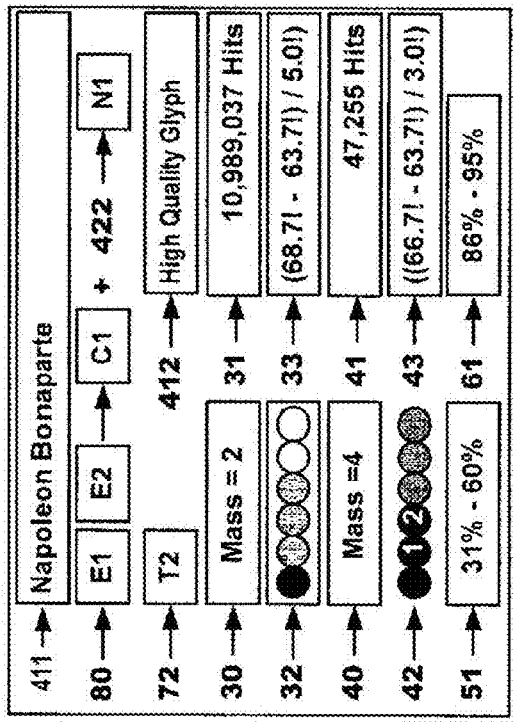
FIG. 9D

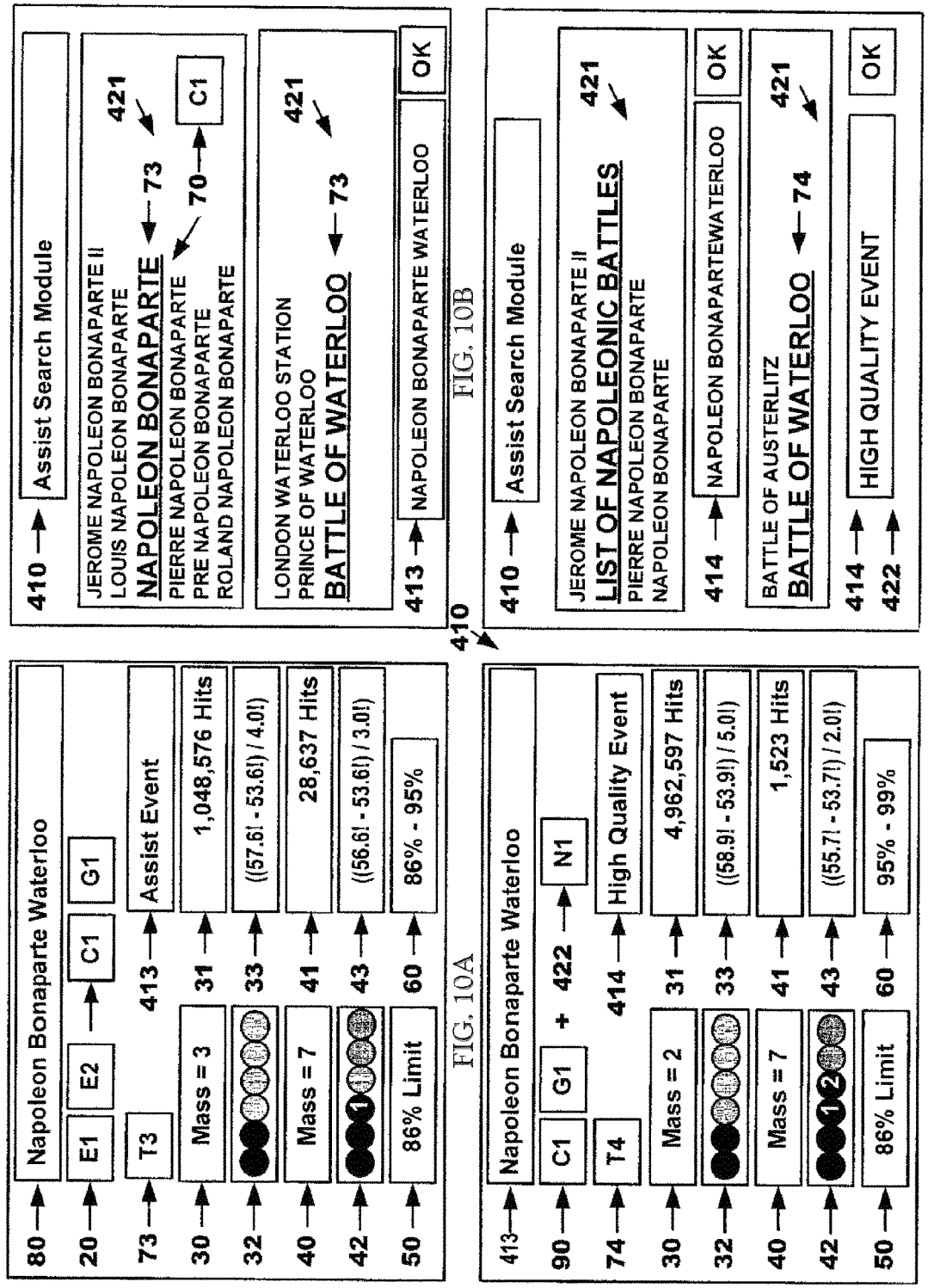

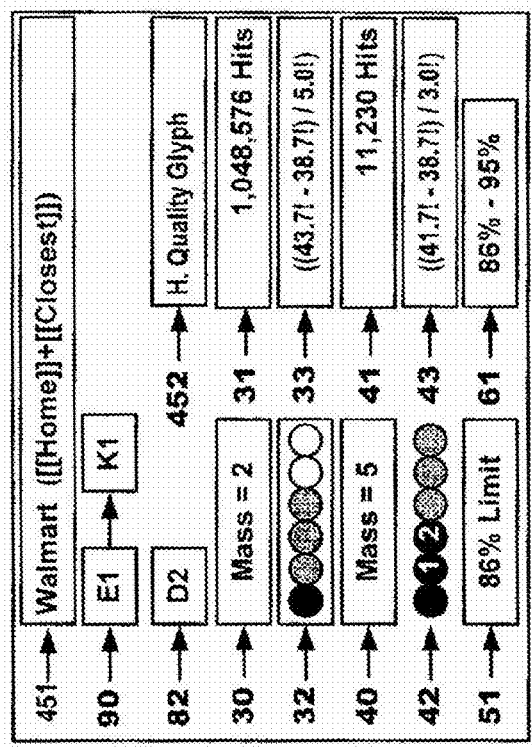
FIG. 11A
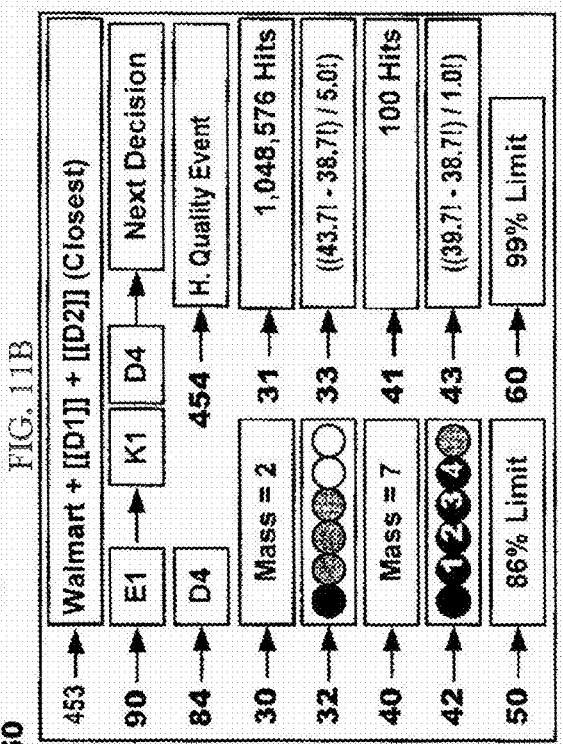
FIG. 11B
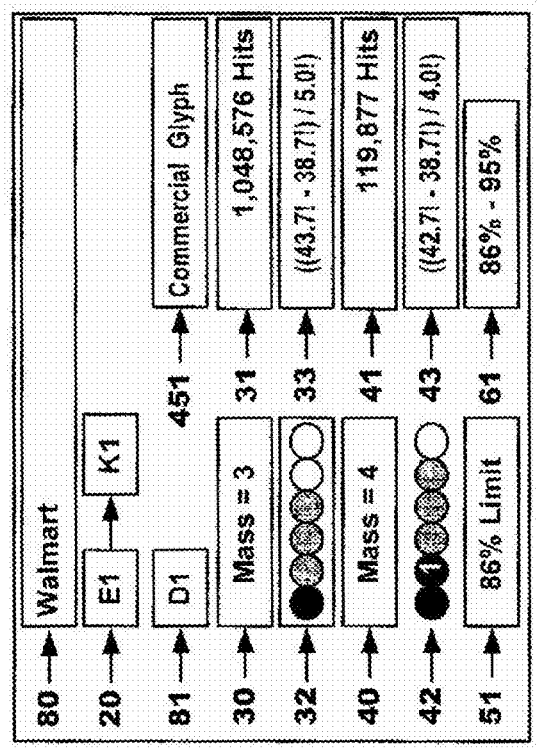
FIG. 11C
FIG. 11D

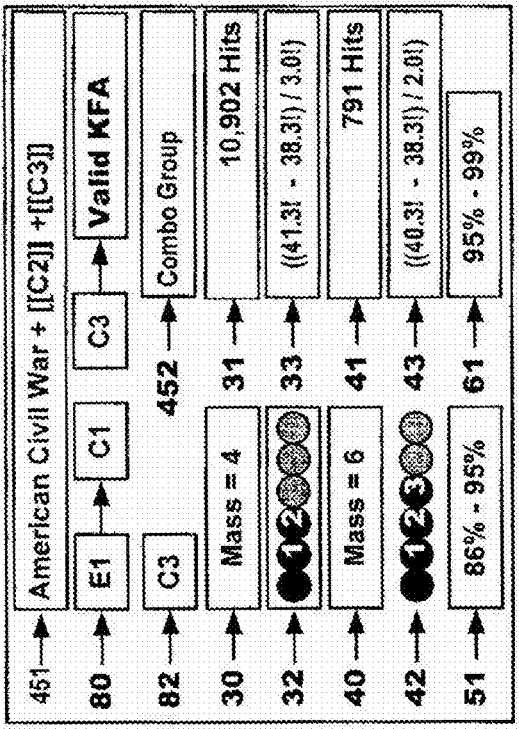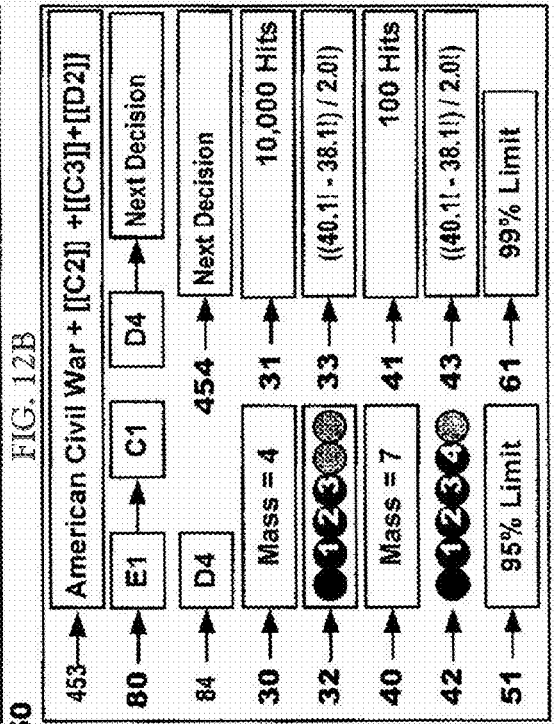
FIG. 12A
FIG. 12B
FIG. 12C
FIG. 12D

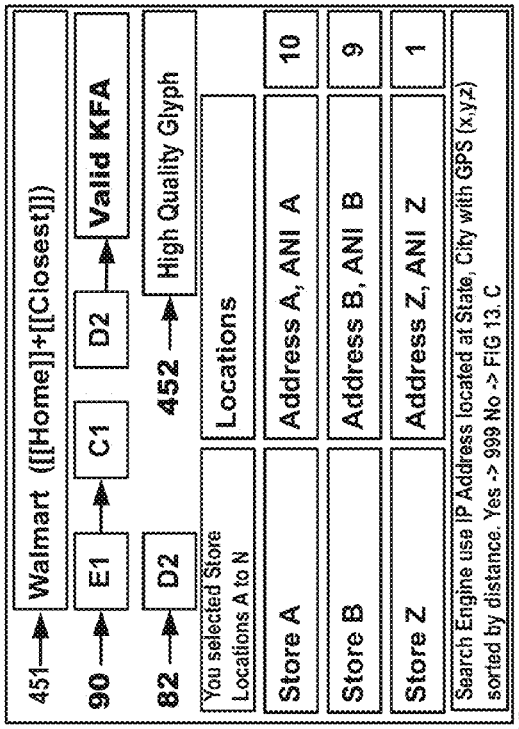
FIG. 13A
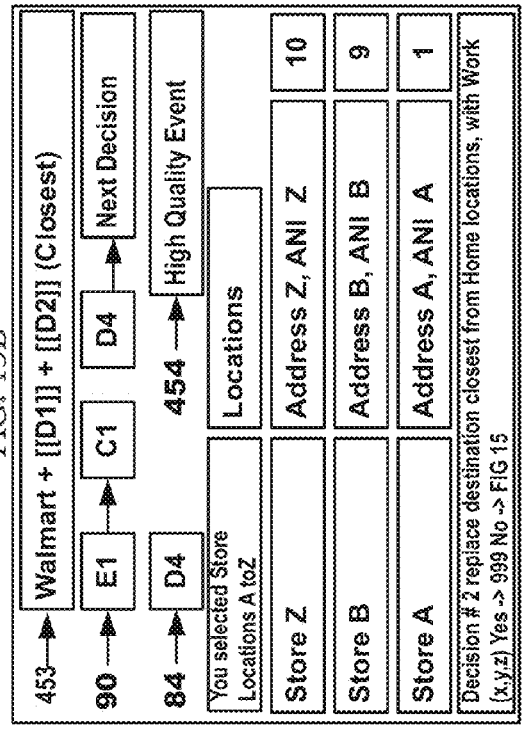
FIG. 13B
FIG. 13C
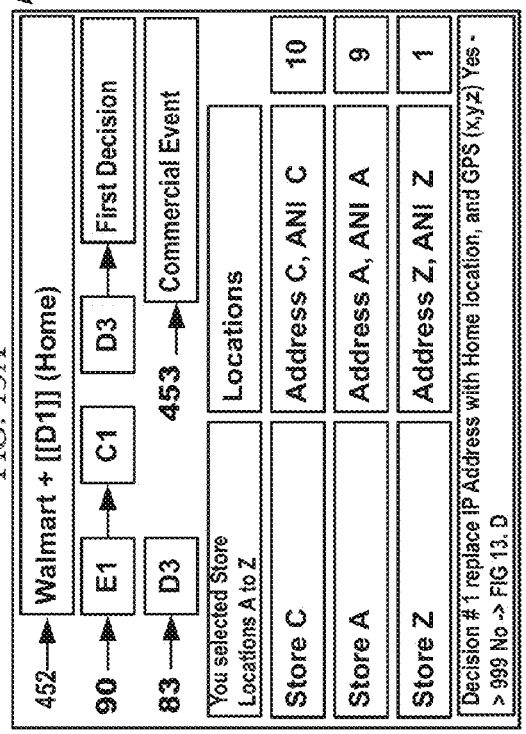
FIG. 13D

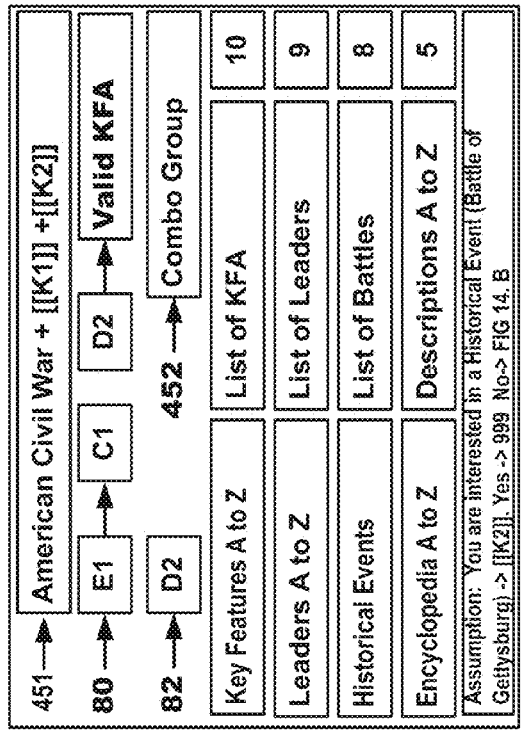
FIG. 14C
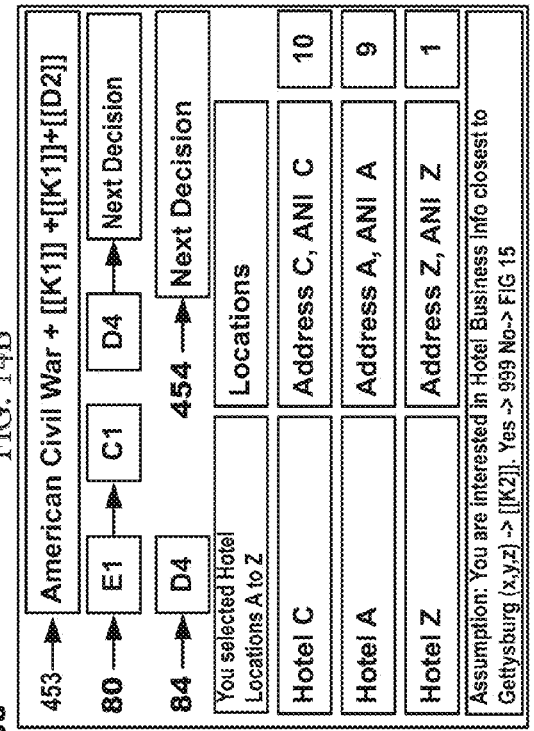
FIG. 14A
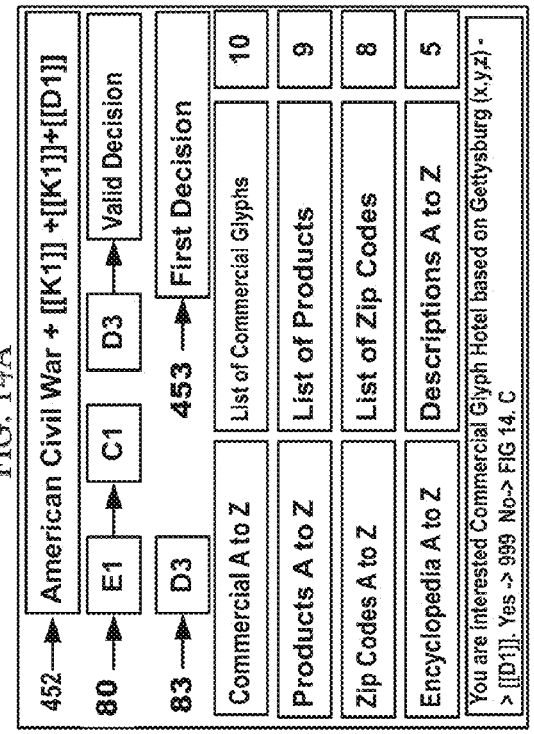
FIG. 14D
FIG. 14B

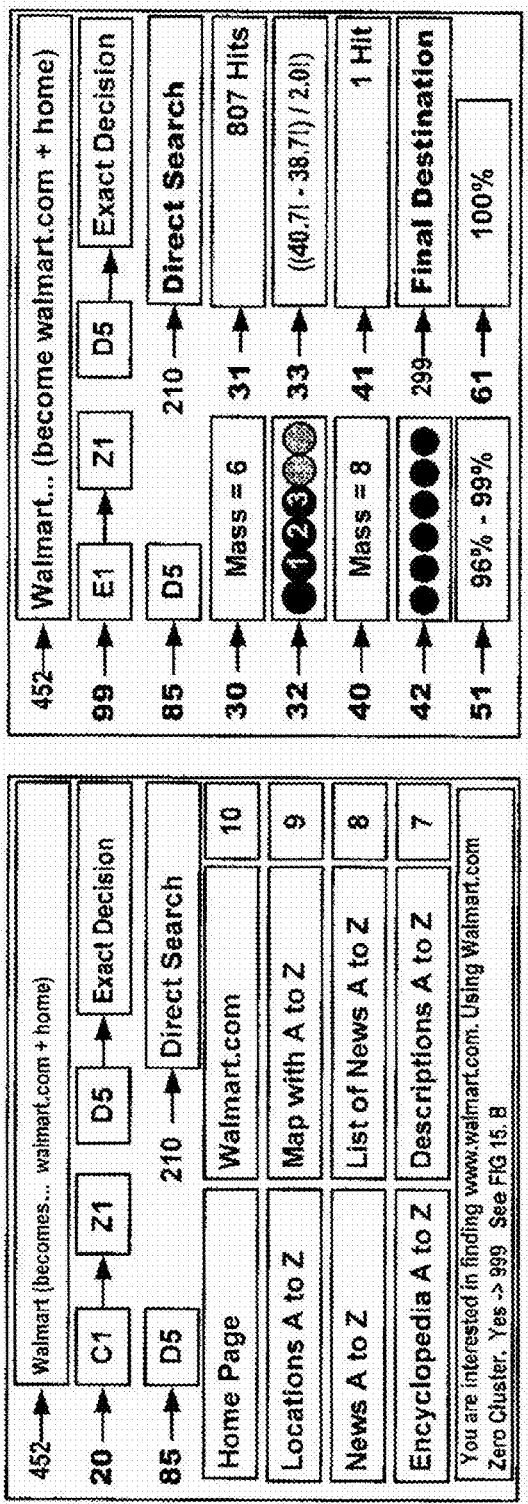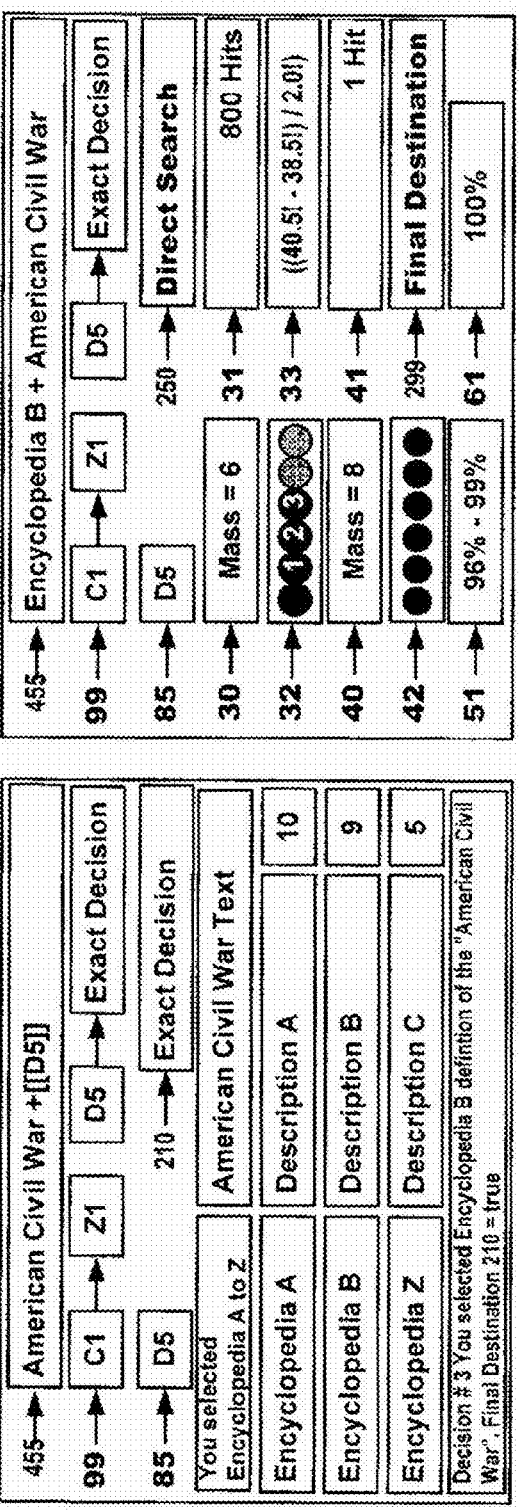
FIG. 16A FIG. 16B
FIG. 16C FIG. 16D

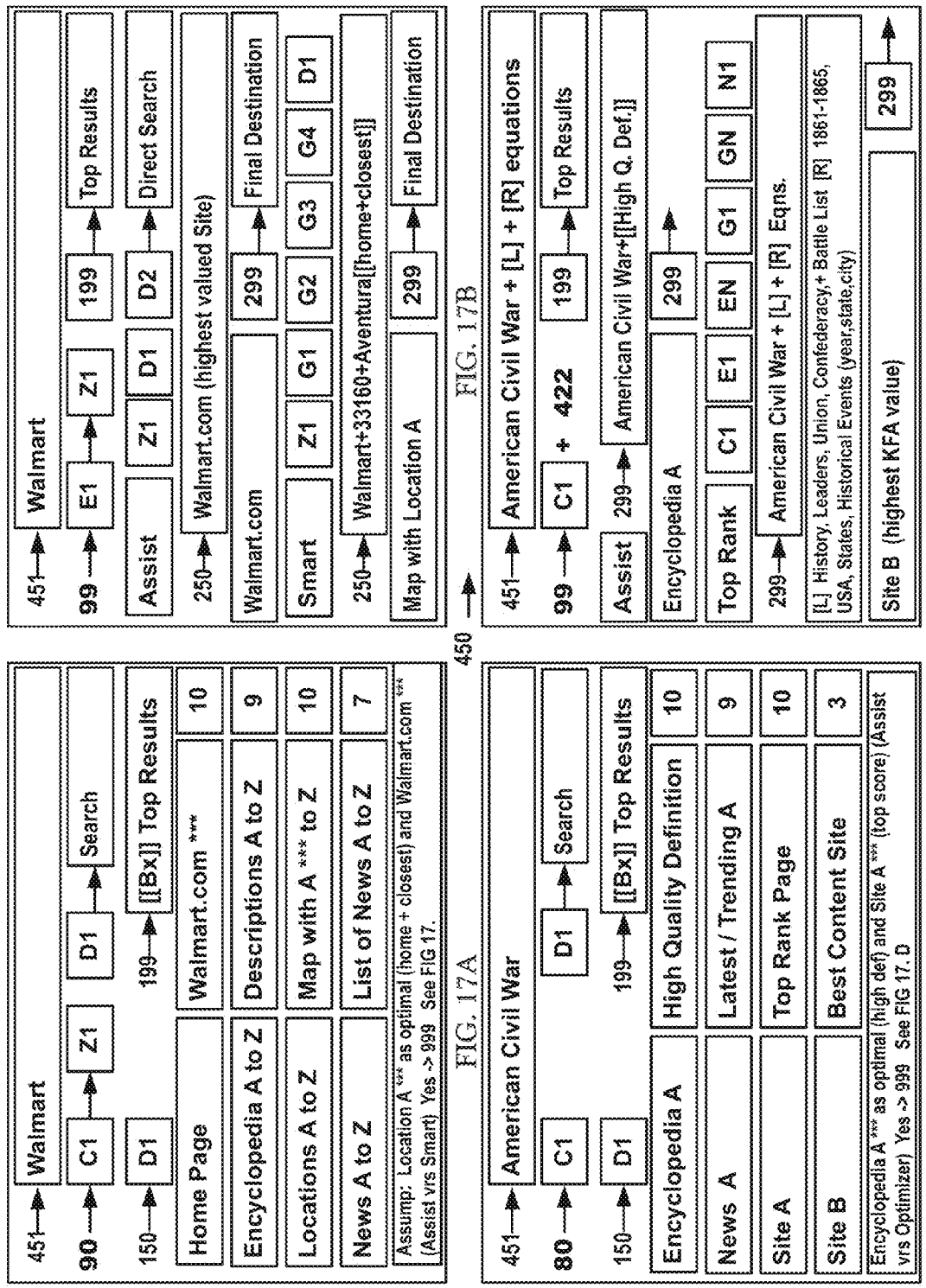

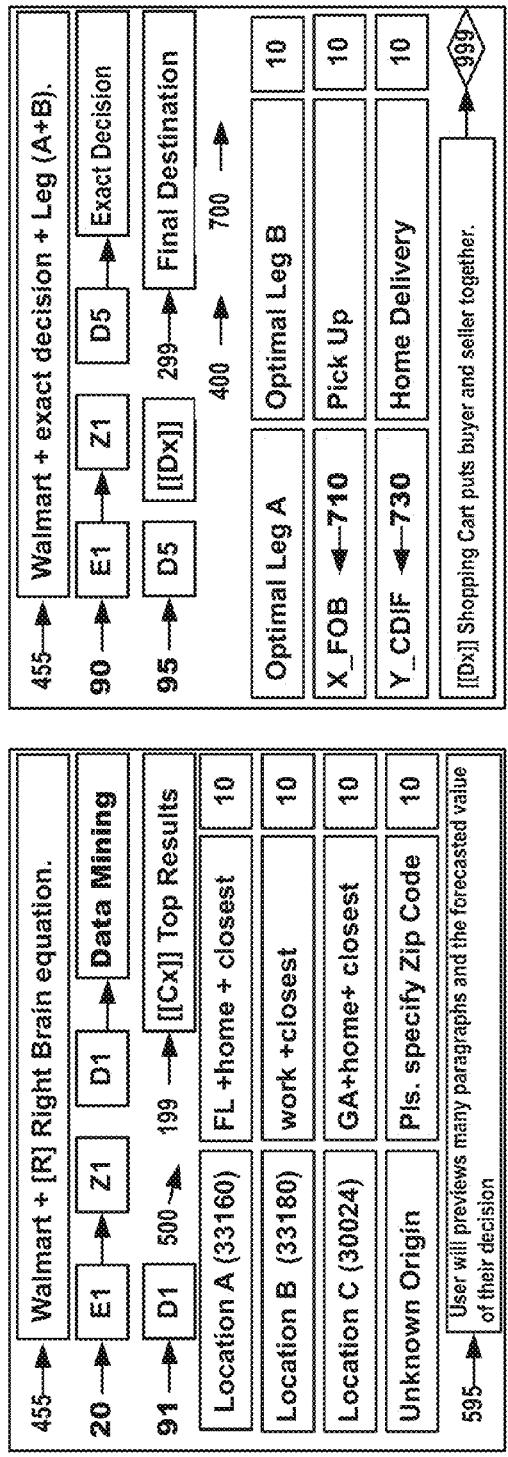
FIG. 18A
FIG. 18C
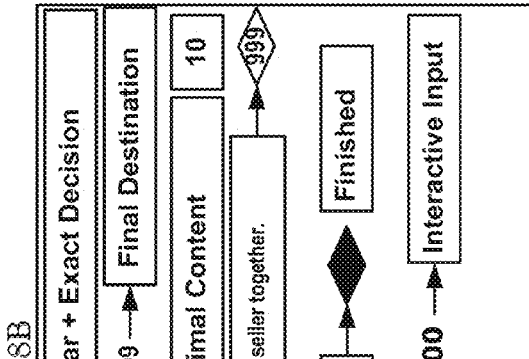
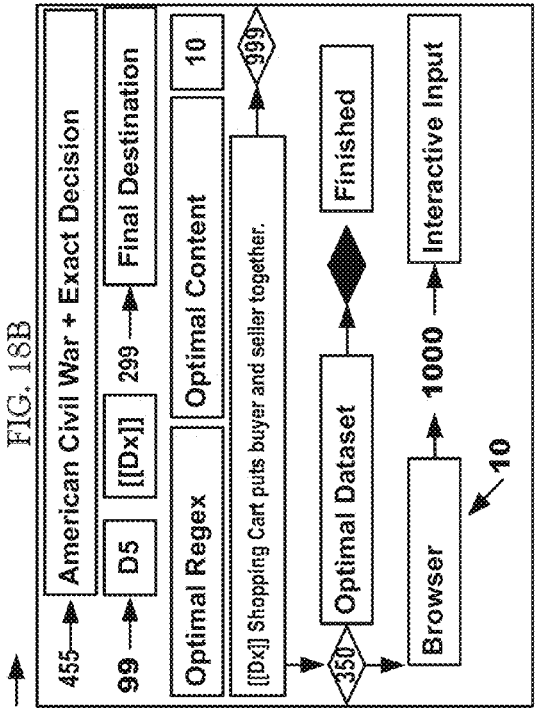
FIG. 18B
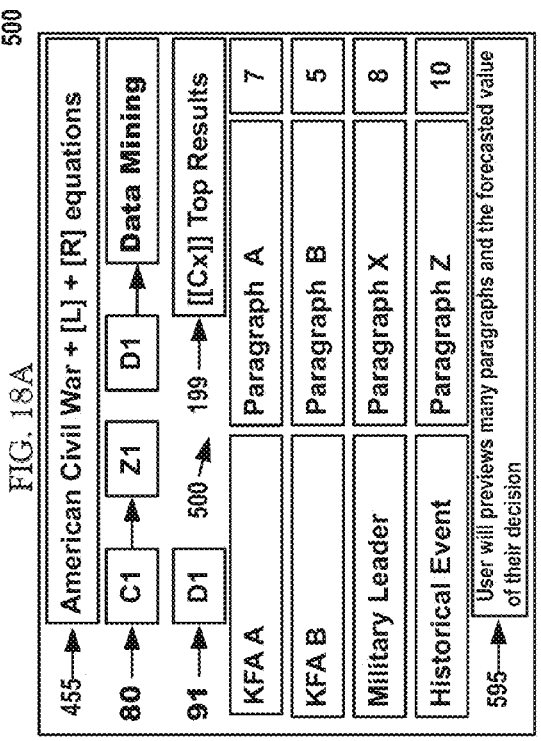
FIG. 18D

SEARCH ENGINE OPTIMIZER

CROSS REFERENCE TO RELATED APPLICATIONS

This Continuation-In-Part Utility Application claims the benefit of co-pending U.S. Continuation-In-Part patent application Ser. No. 13/247, 964 filed on Sep. 28, 2011, which claims the benefit of U.S. Continuation-In-Part patent application Ser. No. 12/785,122, filed on May 21, 2010 (issuing as U.S. Pat. No. 8,386,456 on Feb. 26, 2013), which claims the benefit of the following applications:

a. U.S. Continuation-In-Part patent application Ser. No. 12/146,420, filed on Jun. 25, 2008 (issued as U.S. Pat. No. 7,908,263 on Mar. 15, 2011);

b. U.S. Continuation-In-Part patent application Ser. No. 12/778,228, filed on May 12, 2010 (issued as U.S. Pat. No. 8,239,229 on Aug. 7, 2012), which claims priority to co-pending U.S. Continuation-In-Part patent application Ser. No. 12/764,934, filed on Apr. 21, 2010, which claims the benefit of U.S. Continuation-In-Part patent application Ser. No. 11/584,941, filed on Oct. 23, 2006, (issued as U.S. Pat. No. 7,809,659 on Oct. 5, 2010), which claims the benefit of U.S. Continuation-In-Part Non-Provisional patent application Ser. No. 10/852, 394, filed May 24, 2004, (now abandoned), which claims priority to U.S. Provisional Application Ser. No. 60/184,537 filed on Feb. 24, 2000;

c. U.S. Continuation-In-Part patent application Ser. No. 12/778,228, filed on May 12, 2010 (issued as U.S. Pat. No. 8,239,229 on Aug. 7, 2012), which claims benefit of U.S. Continuation-In-Part patent application Ser. No. 10/926,267, filed on Aug. 25, 2004 (now abandoned), which claims the benefit of U.S. patent application Ser. No. 10/603,963, filed on Jun. 25, 2003 (issued as U.S. Pat. No. 6,842,511 on Jan. 11, 2005), which claims the benefit of U.S. Non-Provisional patent application Ser. No. 09/544,238, filed on Apr. 7, 2000 (issued as U.S. Pat. No. 6,614,893 on Sep. 2, 2003), which claims the benefit of U.S. Provisional Application Ser. No. 60/184,537 filed on Feb. 24, 2000;

d. U.S. Continuation-In-Part patent application Ser. No. 12/778,228, filed on May 12, 2010 (issued as U.S. Pat. No. 8,239,229 on Aug. 7, 2012), which claims the benefit of U.S. Non-Provisional patent application Ser. No. 10/926,446, filed on Aug. 25, 2004 (issued as U.S. Pat. No. 7,050,813 on May 23, 2006);

e. U.S. Continuation-In-Part patent application Ser. No. 12/778,228, filed on May 12, 2010 (issued as U.S. Pat. No. 8,239,229 on Aug. 7, 2012), which claims the benefit of U.S. Non-Provisional patent application Ser. No. 09/514,940, filed on Feb. 28, 2005 (issued as U.S. Pat. No. 7,058,601 on Jun. 6, 2006), f. Continuation-In-Part Non-Provisional patent application Ser. No. 11/223,226 (now abandoned), filed on Sep. 9, 2005, which claims priority to U.S. patent Non-Provisional application Ser. No. 10/135,493 (abandoned), filed on Apr. 30, 2002, which claims priority to U.S. Provisional Application Ser. No. 60/289,033 filed on May 4, 2001;

g. U.S. Continuation-In-Part patent application Ser. No. 11/584,271 filed on Oct. 20, 2006 (now abandoned), which claims priority to U.S. Continuation-In-Part Non-Provisional patent application Ser. No. 10/852,394, (now abandoned) which claims the benefit of Continuation-In-Part patent application Ser. No. 10/603,963, filed on Jun. 25, 2003, (issued as U.S. Pat. No. 6,842,511 on Jan. 11, 2005), which claims the benefit of U.S. Non-Provisional patent application Ser. No. 09/544,238 (issued as U.S. Pat. No. 6,614,893 on Sep. 2, 2003), filed on Apr. 7, 2000, which claims priority to U.S. Provisional Application Ser. No. 60/184,537 filed on Feb. 24, 2000; and h. U.S. Continuation-In-Part Non-Provisional patent application Ser. No. 11/085,678 filed on Mar. 21, 2005 (now abandoned), which claims the benefit of U.S. Non-Provisional patent application Ser. No. 09/819,174, filed on Mar. 27, 2001, (now abandoned), which claims priority to U.S. Provisional Application Ser. No. 60/193,160 filed on Mar. 28, 2000;

i. all of which are incorporated herein in their entireties.

FIELD OF THE INVENTION

The present invention relates generally to an Internet Search Engine Optimizer method and system, hereinafter referred as Optimizer. More particularly, the present invention relates to an interface product that works independently and in parallel with a browser client and search engine supercomputer server architecture that gathers, analyzes, and distills interactive input. The Optimizer analyses input and transforms the input into a search pattern. For each search pattern the Optimizer continuously maintains and updates pre calculated and preprocessed array or collection of best-fit web page responses.

BACKGROUND OF THE INVENTION

The limitations, drawbacks and/or disadvantages of technologies are as follows: Search Engines are based on Boolean algebra eigenvector algorithms that are used to parse and filter information indices until the top page ranks are determined and displayed to the end user. Unfortunately, some specific keywords combinations may be too narrow and confound a search by hiding optimal results. Search Engines are predominately configured to perform static search patterns. Each search is processed from the ground up without taking into account many requests belonging to one reply. A session consists of consecutive related and unrelated search requests to reach the final destination.

The Internet environment or (U) can be construed as a complex and massive volume network with billions. The Search engine supercomputer analyzes the billions of unique web pages, and then uses eigenvectors to determine the highest ranked pages from the end user's match criteria. As explained, in related subject matters "As the size of the environment increases the level of redundancy and tax burden of a system exponentially increases".

Transform Data: The supercomputer system cleans, standardizes and organizes the spaghetti of the environment by organizing the huge amount of information in a managerial hierarchical structured supercomputer (hereinafter referred as HIVE) that removes redundancy, latency and the tax burden.

Synchronize tasks: the HIVE is a decentralized supercomputer consisting of a plurality of nodes, which are specifically arranged in three tiers. The summit tier coordinates and executes global tasks. The middle tier coordinates and executes regional tasks. The lower tier coordinates and executes localized tasks and processes the lion share of non-critical transactions. The summit node of each tier synchronizes tasks by sending command messages that assigns the fuzzy logic state of each node belonging to its chain of command.

Lateral and Vertical Synergy: A tier consisting of groups of nodes that are independent from other groups of nodes. Each tier partition performs mission critical tasks within their domain and works in parallel with other partitions of the same tier. Each node can shunt available resources using lateral and vertical synergy with parent, sibling or subordinate nodes to maximize available resources. Each node continuously analyzes its own environment current conditions and forward chains summary information until reaching the summit. At this point, the summit nodes rearward chain messages with command instructions that priorities resources, and notify each subordinate with command instructions tasks constraints taking into account present network conditions to avoid saturation, clog and eliminate the tax burden of the environment'.

Remove chaos and anarchy: Once the 'spaghetti of the environment' is eliminated the HIVE creates command messages that are also known as environment bitmap data. Command messages coordinate and synchronize each node to operate at maximal output capacity. Each node operates without adversely affecting the network flow of data. The HIVE maximizes available throughput and limits the exponential rate of growth of complexity as the size of the environment increases.

Convert Requests into Ideas: Search Engines dependency on Boolean algebra use inductive reasoning popularity scores to find the top results. In contrast, the HIVE using deductive reasoning to interpret interactive input as being part of an idea being formulated by both the left and the right sides of the brain. When a request is incomplete the HIVE probabilistically supplies and inserts missing gaps of information. Related art teaches that a Vector CDR can be expressed as the summation of a plurality of valid vectors. The HIVE correlates a plurality of partial vectors and creates a resultant vector containing the top (n) pages.

Heartbeat: the Summit tier gives a heartbeat to the HIVE.

The X_FOB and Y_CDIF Inventory Control Bitmaps are commonly known and referred as managerial relationship indices summary results, with pre-calculated look up information to eliminate redundant and resource intensive calculations.

Brief Summary of Applicant's Related Applications

Search Engines use Boolean algebra and eigenvector algorithms to parse and filter information indices until the top page ranks are determined and displayed as output. Unfortunately, some specific keywords combinations may be too narrow and confound a search by hiding optimal results. Search Engines are predominately configured to perform single static search patterns. Each search is processed from the ground up without taking into account many requests belonging to one session. A session consists of consecutive related and unrelated search requests while randomly surfing the web.

The Optimizer in parallel keeps in existence for each search pattern its corresponding virtual simulation environment that contains all relevant bound pages. Each virtual simulated environment possesses a relative Master Index. The Optimizer continuously purifies and synchronizes the plurality of relative Master Index that permits to match/merge and then correlate the Internet's Master Index in real time.

The Optimizer continuously scans and detects the environment in real time for new content with significant difference quality to update each search pattern's virtual environment partition relative Master Index and associated collections of top (n) pages. The Optimizer heuristically reads the content of each page, paragraph, sentence, and term clusters. Existing Master Index has an absolute rank value for each page.

The Optimizer rank value is dynamically adjusted by matching independent variables and related keywords belonging to the search pattern to generate a content value. The Optimizer "cherry picks" the best content value web pages as output. The output is forward chained back to the end user's terminal and displayed.

The Optimizer is a method and system for simulating Internet browser search capacities that cleans, standardizes, organizes, and transforms the massive amount of data into a lingua franca comprising of valid keywords, term clusters, and unique geospatial patterns contained in the Internet collectively known as patterns that exist in page. The comprehensive collection of search patterns with their relative Master Index are stored and continuously updated as web crawlers detect significant changes in the environment.

Each Search Pattern consists of at least one independent variable, e.g. (I), (J), (K), (X), (Y) and (Z). Search Patterns with 0 independent variables use randomly surfing the web techniques that find the final destination within the massive (U) or Internet environment.

Related Applications (U.S. patent application Ser. No. 10/926,446)

Partial Differential Equation Vectors Model: Solves solutions with two or more independent variable. The solution requires an equation with a plurality of independent variables. Thus we replace the traditional vector with Partial Differential Equation Vectors.

E.g. Using Set Theory, the telecommunications environment U can be divided into three independent networks: Fixed (X), IP Telephony (Y) and Wireless (Z). A Simple Call exists when the call uses a single network (X, Y or Z), whereas a Complex Call exists when the call must use more than one independent network environment to complete the call.

E.g. A call uses three different networks Fixed, IP Telephony and Wireless (I, J, K), each independent variable solves the billing entity and resultant vector for the call. The Switch controlling the call uses its Partial A and Partial B functions to create a final resultant vector that includes all the circuits belonging (I, J, K) for just one call. Yes, they are three independent calls one per network which is billable, yet in fact there is only one call.

Related Applications: (U.S. patent application Ser. No. 10/852,394)

Computer Network System: consists of a plurality of nodes, where each one is programmed with Artificial Intelligence to perform predefined tasks that are logistical rationalized based on the current conditions of the environment. The computer network system is synonymous with Superset (U). The cluster is divided into three geospatial tiers: a) Global, b) Regional, and c) Local. Each tier has multiple functionalities such as a) provisioning, b) Total Quality Management or (TQM), c) Data Manipulation, d) Management Information Systems (or MIS), e) Expert Information Systems (or EIS) and f) Inventory Control.

Computer Network System Nodes: All nodes are autonomous and in real time analyze, evaluate, gather and process information from the environment. From incipiency upon receiving the fuzzy logic piece of information that triggers a new task or update pending activities. Each node is assigned to Superset(I), Set(I, J), or Subset(I, J, K) cluster tier, and to the geospatial domains (X) or global, (Y) or regional, and (Z) local to map independent variables (I, J, K, X, Y, Z) that build the managerial hierarchy as follows:

Managerial Hierarchy: The Summit Tier allows users to have access to their information in real time. The Middleware Tier geographical manages physical warehouses. The Lower Tier controls a plurality of points of presence belonging to 3$^{rd}$ parties and collectively constitutes the workhorse of the system.

Node Synchronization and Buffer Resources: Every predefined cycle each node synchronizes the latest inventory. Nodes request siblings for any excess buffer resources to complete a task using vertical and lateral synergy. Parent nodes use their chain of command to coordinate their subordinates. Thus, all nodes synergistically collaborate to process tasks and collectively mimic a global online supplier.

Eliminates the Spaghetti Phenomena: The global online supplier gathers, distills, analyzes and then standardizes raw information into primed lingua franca data so that Information Certainty is achieved and thus removes the chaos and anarchy or Spaghetti Phenomena.

Primes Vector CDR: Lingua franca messages are Vectors and contain the vector trajectory and all transactional segments information. Legacy systems send all transactional segments to centralized billing data warehouses that match/merge each transactional component and then correlate the information into a billing entity. Whereas the computer network uses artificial intelligence to assign a hierarchical owner and plots circuit by circuit the vector trajectory and only activates relevant nodes to the transaction so that nodes can communicate amongst themselves via forward and reward chaining. Nodes send all dynamic and fixed costs to hierarchical owner so it can correlate the rated billing entity absent of a centralized billing data warehouse.

Avoids Taxing the Throughput: The computer network system monitors the limited resources and capacities of the network to avoid taxing available throughput in real time. Each node can create, plot and update resources as soon as new relevant messages from the environment are detected.

Uses Synergy to Maximize Throughput: Upon receiving environment command instructions each node can manage the flow of information of their subordinates from predefined point A to point B routes to avoid saturation. The computer network maximizes throughput by permitting each node via synergy to shares resources with other nodes that have substantial buffer resources to eliminate the tax burden and waste.

Analyzes Network Traffic: Network traffic is analyzed as the informational traffic is measured based on the latest command instructions and known routing throughput limitations of each given domain. The summit nodes of each tier perform the nonobvious task synchronizing and managing their subordinates to use synergy to minimizing waste before permitting data to be transmitted through their chain of command.

Computer Network System Reaches Informational Certainty: Nodes remove waste at incipiency one transaction at a time, so that the computer network system can be considered a real time invention.

Computer Network System Stabilizes the Flow of Information: Summit and Middleware nodes stabilize the flow of information and update the XLDB database with trending statistics used to optimize resources and available bandwidth. Each node of the managerial hierarchical synergy works in parallel with others nodes to work as a single unit permitting the computer network to create a virtual instance of the organizational environment.

Computer Network System is a Real Time System: Once the 'Spaghetti Phenomena' is eliminated, informational certainty is achieved removing the need for a central mainframe. Consequently, a real time solution consists of synergistically synchronizing all the computer network system functions.

Computer Network System Evaluates Network Resources: Each node has its own location identification means and must be assigned to one geospatial specific domain cluster such as local, regional or global. Each activity and task is processed in parallel, starting from the point of origin and ending at the point of destination. The computer network system rearward chains the routing vector information through the simulation network to the point of origin and analyzes and evaluates the best usage of network resources.

Related Applications (U.S. patent application Ser. No. 11/584,941/Issued U.S. Pat. No. 7,809,659)

XCommerce, Deductive Reasoning Supercomputer: is a method that simulates the entire superset of potential valid interactive input regular expression requests construed during an Internet browser search and converting the results set into a vector based statistical data that enable efficient and accurate searching. XCommerce simulates, standardizes and partitions the Internet into a plurality of concurrently working environment using a Managerial hierarchical method of indexing and searching as follows:

Managerial Hierarchical Index Relationships: a request is broken down into keywords and clusters, and then converts them into a search pattern that optimally minimizes the quantity of relevant pages.

Determining what is Relevant and Irrelevant: Pages that match a Relationship Index are relevant, and those that do not are irrelevant. Irrelevant web pages are discarded completely from analysis.

Partition the Environment into Blocks: the environment is subdivided into a plurality of blocks that are arranged based on Managerial Hierarchical levels as follows:

Each Search Pattern restricts the geometric rate of growth of the Internet environment by creating the relevant environment that is used by all managerial relationship levels when purifying the search process.

The Internet environment is considered a Super Block and is partitioned into a three level Managerial Hierarchy. First: the primary index relationship creates Blocks that maps an improved environment. Second: the secondary index relationship creates Sub Blocks that maps an optimal environment. Third: the tertiary index relationship creates Mini Blocks that maps an optimal solution.

Identifies Static Search Patterns: the computer network system determines if the search pattern already exist and if yes obtains the top (n) pages from the databases and sends the output to the end user.

Calculates Dynamic Search Patterns: uses managerial hierarchical relationship indices to create optimal size partitions and compares remaining key featured associations to determine if they match against the content of the top (n) pages. When a match occurs each page is gain factored by each key featured association vector value and then the Optimizer picks the top (n) pages with the highest values.

Finds New Search Patterns: stores each new search patterns and top (n) pages.

Displays Top (n) pages: Sends and displays the output to the end user's terminal.

Related Applications (U.S. patent application Ser. No. 12/146,420/Issued U.S. Pat. No. 7,908,263)

A search engine optimizer, hereinafter referred as Cholti, gathers interactive input from a browser. The optimizer reorganizes the interactive input as optimal input that is sent to the search engine, and then the output is sent to the end user. Each request is converted into a search pattern and stored as a mathematical equation that mimics the left (linguistics) and right (geospatial) side of the brain.

Related Applications (U.S. patent application Ser. No. 12/764,934)

Lottery Mathematics: Cholti and XCommerce teaches how to improve accuracy of a requests by using independent variables (I, J or K) to map and create managerial hierarchical partitions of the Internet environment such as: from top to bottom Superset(I), Set (I, J) and Subset (I, J, K) datasets. For this application Lottery Mathematics is hereinafter referred to as Logic Mathematics.

Hot and Cold analysis: uses logic mathematics to estimate the size of the environment as the end user types interactive input and assigns primary independent variable (I) to the filter with the following formula: $(x!-(x-6)!)/6!$ E.g. the number of permutations for a 10 number draw is $(10!-4!)/6!$ $4!=24$, $6!=720$ and $10!=3,628,800$. $(3,628,800/24)/720=210$ permutations. Thus, each grid has 1/210 in being the outcome. The English language estimated Master Index size of the environment in the year 2013 is Logic_305 Basis or 1,099,511,627,776 or $(2^{40})$ pages hereinafter for simplicity 1 trillion.

E.g. the number of permutations for a 305 number draw is 1 trillion or $305!-(305-6!/6!$ The quality of the Glyph that represents (I) or primary index relationship determines the Mass. E.g. If the keyword Civil=(I) the Mass=1, and if cluster "American Civil War"=(I) the Mass=2.

TABLE 1

Size of environment based on Mass

| | |
|---|---|
| a. | Mass = 0 (Logic_305_Basis = 1 trillion) or 305! − (305 − 6)!/6! |
| b. | Mass = 1 (Logic_100_Basis = 1,192,052,400) or 100! − (100 − 6)!/6! |
| c. | Mass = 2 (Logic_70_Basis = 131,115,985) or 70! − (70 − 6)!/6! |
| d. | Mass = 3 (Logic_50_Basis = 15,890,700) or 50! − (50 − 6)!/6! |
| e. | Mass = 4 (Logic_40_Basis = 3,838,380) or 40! − (40 − 6)!/6! |
| f. | Mass = 5 (Logic_30_Basis = 593,775) or 30! − (30 − 6)!/6! |
| g. | Mass = 6 (Logic_20_Basis = 38,760) or 20! − (20 − 6)!/6! |
| h. | Mass = 7 (Logic_15_Basis = 5,005) or 10! − (10 − 6)!/6! |
| i. | Mass = 8 (Logic_6_Basis = 1) or final destination. |

I. Simulating the Human Brain:

Human Brain: Each linguistic Glyph is assigned to the [L] left side of the brain and each geospatial Glyph is assigned to the [R] right side of the brain and the Anchor is the best common denominator Glyph.

The Dominant Tendency of each request is given a [L] linguistic, and [R] geospatial tendency, and then Cholti reorganizes, maps and plots the Glyphs to create a Managerial Hierarchical Relationship Index.

Human Brain Intelligence: transforms each Search Pattern and identifies independent variables based on mass partitions of the Internet and creates Join, Simple, Hybrid, Complex and Optimal Pyramids.

Human Brain Wisdom: analyzes the top (n) pages and expands each [AX], [BX] and [CX] Glyph equation with key featured association dependent variables.

Cholti picks one of four Search Strategies: [LL], [LR], [RL], and [RR], which have different set of business rules to analyze the Internet and limits partitions not to exceed 1 billion or $(2^{30})$ pages and thus eliminates the principal confounding variable, which is the exponential rate of growth of the environment.

E.g. the environment grows geometrically to 20 billion, or 40 billion or 100 billion or 1 trillion pages, but once the Dominant Tendency is selected the relevant environment will always be a Logic_100_Basis or 1,192,052,400 pages, while making most pages irrelevant.

II. [L+R] Managerial Relationship Events

If the independent variable (I) is represented by the Historical Event "American Civil War" {1863}, where "American Civil War" is the left side of the brain variable (I) and 1863 is the right side of the brain (X), and are merged to a Single Event or Superset(I!) with Mass=3. The Double Event or Set(I,J) !! with Mass=5 and (I, J, X, Y) independent variables, and finally for Triple Event or Subset (I, J, K)!!! with Mass=8 consisting of [L] left side of the brain (I, J, K) and [R] right side of the brain (X, Y, Z) independent variables.

First Significant Event or (FSE): is a vague search that maps an improved environment. The Internet environment (a, b, c, d, e, f) becomes the improved environment (FSE, b, c, d, e, f) for Superset(I) dataset. Hereinafter Lucky numbers are replaced with IV that is the abbreviation for Independent Variables.

TABLE 2

FSE Size of environment based on Mass

| | |
|---|---|
| a. | Mass = 1 (Logic_100_IV_1 or 75,287,520) or 100! − (100 − 5)!/5! |
| b. | Mass = 2 (Logic_70_IV_1 or 12,103,014) or 70! − (70 − 5)!/5! |
| c. | Mass = 3 (Logic_50_IV_1 or 2,118,760) or 50! − (50 − 5)!/5! |

Second Significant Event or (SSE) is a concise search that maps an optimal environment. The Internet environment (a, b, c, d, e, f) becomes the optimal environment (FSE, SSE, c, d, e, f) for Set(I, J) dataset.

TABLE 3

SSE Size of environment based on Mass

| | |
|---|---|
| a. | Mass = 1 (Logic_100_IV_2 or 3,921,225) or 100! − (100 − 4)!/4! |
| b. | Mass = 2 (Logic_70_IV_2 or 916,895) or 70! − (70 − 4)!/4! |
| c. | Mass = 3 (Logic_50_IV_2 or 230,300) or 50! − (50 − 4)!/4! |
| d. | Mass = 4 (Logic_40_IV_2 or 91,390) or 40! − (40 − 4)!/4! |
| e. | Mass = 5 (Logic_30_IV_2 or 27,405) or 30! − (30 − 4)!/4! |

Third Significant Event or (TSE) is a precise search that maps an optimal solution. The Internet environment (a, b, c, d, e, f) becomes the optimal solution (FSE, SSE, TSE, d, e, f) for Subset(I, J, K) dataset.

TABLE 4

TSE Size of environment based on Mass

| | |
|---|---|
| a. | Mass = 1 (Logic_100_IV_3 or 161,700) or 100! − (100 − 3)!/3! |
| b. | Mass = 2 (Logic_70_IV_3 or 54,740) or 70! − (70 − 3)!/3! |
| c. | Mass = 3 (Logic_50_IV_3 or 19,600) or 50! − (50 − 3)!/3! |
| d. | Mass = 4 (Logic_40_IV_3 or 9,880) or 40! − (40 − 3)!/3! |
| e. | Mass = 5 (Logic_30_IV_3 or 4,060) or 30! − (30 − 3)!/3! |
| f. | Mass = 6 (Logic_20_IV_3 or 1,140) or 20! − (20 − 3)!/3! |
| g. | Mass = 7 (Logic_15_IV_3 or 445) or 10! − (10 − 3)!/3! |

Fourth Significant Event or (QSE) is an optimal search that maps the optimal answer. The Internet environment (a, b, c, d, e, f) becomes optimal answer (FSE, SSE, TSE, QSE, e, f) as follows:

TABLE 5

QSE Size of environment based on Mass

| | |
|---|---|
| a. | Mass = 1 (Logic_100_IV_4 or 4,950) or 100! − (100 − 2)!/2! |
| b. | Mass = 2 (Logic_70_IV_4 or 2,415) or 70! − (70 − 2)!/2! |
| c. | Mass = 3 (Logic_50_IV_4 or 1,225) or 50! − (50 − 2)!/2! |
| d. | Mass = 4 (Logic_40_IV_4 or 780) or 40! − (40 − 2)!/2! |
| e. | Mass = 5 (Logic_30_IV_4 or 435) or 30! − (30 − 2)!/2! |
| f. | Mass = 6 (Logic_20_IV_4 or 190) or 20! − (20 − 2)!/2! |
| g. | Mass = 7 (Logic_15_IV_4 or 45) or 10! − (10 − 2)!/2! |

Gamma Functions

Cholti and XCommerce teach how to create search patterns that improve the accuracy of a request. The Likely and Unlikely analysis uses Gamma functions to solve for the size of the environment.

E.g. the end user types 1863 American Civil War, which the Optimizer automatically maps the [L] left side of the brain term cluster "American Civil War" with [R] right side of the brain geospatial keyword to create "American Civil War". The "War between the States" is also synonymous with the American Civil War, and thus "between the" which are dependent variables since they have a Mass less than 1. The Dominant Tendency and the keyword "States" which has a Mass of 1+ is Likely. Let us assume, the keywords {1861, 1862, 1864 and 1865) are Unlikely. The Likely and Unlikely Gamma function values are as follows: "American Civil War" {1863}=50!–(50–5)!/5! or 2,118,760 pages. Plus "States" Likely Analysis:=49.9!–(49.9–5)!/5! or 2,096,762 pages. Plus Unlikely Analysis:=49.86!–(49.86–5)!/5! or 2,088,014 pages.

Search Pattern Variables

Independent Variables: The IV Numbers are the control variables or independent variables that determine the Circle of Accuracy, which in turn limit the size of the environment.

Dependent Variables: The Dependent Variables (hereinafter DV) Numbers are the observable variables or dependent variables, and are considered strong filters.

Complement Variables: The Complement Variables (hereinafter CV) Numbers are the measured variables or dependent variables, and are considered weak filters.

TABLE 6

Gamma function adjustment of the Logic Basis

| | | | |
|---|---|---|---|
| a. | Independent/Control Variables | (IV Numbers) | +1.00 |
| b. | Dependent/Observable Variables | (DV Numbers) | +0.100 |
| c. | Dependent/Complement Variables | (CV Numbers) | +0.010 |

Partial Differential Equations: When using Partial Differential Equations usually the solution is not unique due to the fluid and dynamic conditions of the search process, and ergo input combination usage behavior directly affects the size of the environment (or boundary of the region) where the solution is defined.

Related Applications (U.S. patent application Ser. No. 13/247, 964)

Simulation Comparison

'Boolean Algebra: End user types the input "Napoleon" or (i) and the inductive reasoning search engine assigns a "1" when a match occurs, and sums up the number of unique occurrences which is equal to 8,000,000 pages. Like always there is good, bad and ugly content. Based, on the business model of the search engine companies the lion share of their profit comes from advertisement, we will assign as (j) the commercialization process, which shrinks the environment to 10,000 pages, and the further distill by using the page quality value to create an environment of 100 pages. At this point selecting the top (n) result is really easy, by just automatically selecting the pages with the highest page rank and then send the output to the end user's browser. In this case the top site will always be wikipedia.com since Ask.com and Powerset technologies made a great emphasis of the content quality value of this site and then search engine industry followed. Encyclopedia Britannica is (2) and Encarta is (3) have a 10 in quality value and have a very high page rank Cholti: determines that "Napoleon" is the anchor and commercial keyword and using the human brain strategy creates an [LL] environment of 8,000,000 pages that possess Super Site (a, b, c) characteristics, which is used to create the Simple Pyramid and [AX] Macro Page that converts "Napoleon" into "Napoleon Bonaparte" and adds "France", "General" and "Emperor" to the Advanced Glyph equation with magnitude of 7. At this point Cholti uses Super Site (d) actual content characteristics, to create the Hybrid Pyramid and [BX] Macro Page that adds "Austerlitz", "Waterloo", "Blucher" and "Wellington", and "1801 to 1815" to the Improved Glyph equation with magnitude of 10. Cholti now uses Super Site (e) trending characteristics, to create the Complex and [CX] Macro Page that adds a collection of key featured associations to the Optimal Glyph equation with magnitude of 15. Now Cholti performs the 'Cherry Picking' process to select the top (n) pages by reading, deciphering, analyzing the actual content.

The Real Difference: Wikipedia.com will always be the optimal web page for the static and vague search, whereas Cholti has three paths (a) (Static Ranking) for concise searches Wikipedia.com is automatically the optimal response, (b) (Actual Content) for precise searches if the end user typed additional keywords, and Cholti determines that Encyclopedia Britannica is the best fit content, then Wikipedia.com is demoted from the automatic $1^{st}$ position and sent to the $2^{nd}$ position. (c) (TQM levels of satisfaction) for optimal searches where wikipedia.com had the top spot, but did not satisfy, and after the second request Encyclopedia Britannica had the top spot, and also did not satisfy, for the third request the top responses for the request (1-2) are demoted, and now Encarta Encyclopedia the other high quality content has the top spot. Cholti is dynamic and personalized whereas existing search engines are static. TQM is the heart and soul of the technology and thus customer satisfaction. Yes, accuracy is directly related to the time from beginning to end, and the amount of knowledge and work required from the end user to reach the final destination, Cholti previews the entire content in behalf of the human to minimize TIME and using deductive reasoning to reduce the amount of gray matter required to reach the final destination to maximize satisfaction.

We've overcome these "issues" or greatly improved the search optimally by doing the following: Generally stated end user's requests are converted into the Mayan style Glyphs that have left side and right side of the brain characteristics. The system understands that each request on its own can be optimally satisfying, and also knows that some require trial and error method. To solve this dilemma the optimizer creates Super Glyphs that have weighted value for a plurality of instances within a session.

Cholti Method

Minimally the system needs to be a computer with a database means that store a 'CORE List' that consists of statistics for each keyword or cluster performing the following steps:

a. Identify each keyword interactively.

b. Validate each keyword to belong to a group.

c. Verify if a keyword will be an active participant in the process of reducing the size of the environment.

d. Estimate the [AX] or 'Before' vague search environment size from the input typed by the end user.

e. Determine if the end user's request is significant.

f. Create Basic Glyphs that best reflects the essence of the [AX] or 'Before' request that will permit the creation of a hierarchical set consisting of a plurality of valid Superset(I), Set(I, J) and Subset (i, j, k).

g. Reorganize the end user's request to create Advanced Glyphs that further distills and shrinks the size of the environment using the [BX] or 'After' request.

h. Recognize Advanced Glyphs to determine if it already exists in the 'CORE List'. If the Advanced Glyph exists in the 'CORE List' the output is readily available and preprocessed no further calculations are required. Otherwise, the system must continue with [CX] or 'Improved' and [DX] or 'Optimal' samples.
  i. Request the server to perform the 'Improved' sample by hierarchical distributing the search amongst subordinate based on ownership of the primary, secondary and tertiary keyword or term cluster. The Basic and Advanced Glyphs are used to assign size parameter to each valid set of the hierarchical set.
  j. Adjust dynamically the value of each keyword and term cluster.
  k. Exclude identified Zero Cluster keywords.
  l. Emphasize through rules of association and transitivity a plurality of requests that are considered to have common denominator elements and are then correlated into a partial environment. The partial environment consists of a plurality of request. The partial environment retains the characteristic of each individual request.
  m. Deemphasize unrelated keywords to the last significant end user's request. This process is also known as Mulligan and is uses set theory to determine the relationship between input and the last significant request.
  n. Maximize keyword values by using the Hot Algorithm that measures the usage pattern and significance of a keyword in a session.
  o. Minimize keyword values by using the Cold Algorithm that weights keyword irrelevancy. 'Zero Clusters' and unrelated keywords have a reasonable probability of hiding the optimal result.
  p. Correlate at least one partial environment into the [CX] or 'Improved Samples. This process draconically reduces the environment size using Hot & Cold Algorithm parameters and stores the essence of the matter into the Super Site of each valid and visible page.
  q. Assign a corporate signature to each Super Site.
  r. Pick the small [CX] Sample top results of each hierarchical set to generate a collection of Super Pages.
  s. Distill the small [CX] Sample using geospatial dimensions that have exact or estimated latitude and longitude components such as Country, Region, LATA, Zip Code, IP Address and ANI.
  t. Commercialize keywords if the already exist in the Commercial Glyph database.
  u. Deciphers, analyzes the actual content (gray matter), measures TQM level of satisfaction (trending) of each page in order to pick using reasoning the [DX] or optimal sample.
  v. Translate the interactive input into a Cholti language Super Glyph equation.
  w. Respond with the output or optimal response. The output may be identified as already existing in the preprocessed 'CORE List' in step h) "recognize all preprocessed calculations in the search pattern database. New search patterns not found in the search pattern database perform steps i) "request" to v) "translate".
  x. Display to the end user the output or optimal request. The formatted output is considered an object.
  y. Recalculate each time the "optimal button" is clicked in the web browser and significant difference event is estimated compared to the latest Super Glyph equation or partial environment.
  z. Consolidate a plurality of partial environment into a resultant environment that is contained with the valid environmental size of the hierarchical set.

Cholti Triangulates the Search Process $1^{st}$ transforms vague searches into Super Glyph ideas and simulates the human brain to assign a search strategy [LL], [LR], [RL], and [RR] and anchor or commercial cluster and employees independent variable (I) to create the improved environment with 1,000,000 pages, and thus eliminates independent variable (I) from any further calculation.

$2^{nd}$ amends vague searches into concise searches employing rules of association and relevance to create the optimal environment with 10,000 pages, and thus eliminates independent variable (J) from any further calculation.

$3^{rd}$ improves concise searches into precise searches and then measures the actual content based on likeness and trending to create the Optimal solution with 100 web pages, and thus eliminates independent variable (K) from any further calculation.

$4^{th}$ Ameliorates precise searches into optimal searches and then 'Cherry Pick' the actual content to create an optimal environment of the top response, and also expands the Search Pattern Super Glyph equation when changing the environment.

In conclusion static and vague searches use the Internet environment with billions of web pages. Cholti converts the vague search into static or dynamic Glyph equations that create a Search Pattern that is best described as a managerial hierarchical informational pyramid object as follows:

$1^{st}$ maps English language input to the left brain equation and geospatial input to the right brain equation, and the determines the dominant tendency of the brain to assign a Search Strategy to create a Join Pyramid or Super Block that maps a relevant environment with 1 billion pages as the lowest level of informational certainty.

$2^{nd}$ utilizes the anchor Glyph and Commercial Glyph to purify and shrink the size of the environment, and the uses the primary independent variable (I) to changes the vague search into a concise search that creates a Simple Pyramid or Block that maps an improved environment with 1,000,000 web pages that replaces and eliminates the primary independent variable (I) from further calculation. Assigning the Simple Pyramid with a partial master index.

$3^{rd}$ uses independent variable (J) to changes the concise search into a precise search that creates a Hybrid Pyramid or Sub Block that maps an optimal environment with 10,000 web pages that replaces and eliminates the secondary independent variable (J) from further calculation. Assigning the Hybrid Pyramid with a partial master index.

$4^{th}$ uses independent variable (K) to changes the precise search into an optimal search that creates a Complex Pyramid or Mini Block that maps an optimal solution with 100 web pages that replaces and eliminates the tertiary independent variable (K) from further calculation. Assigning the Complex Pyramid with a partial master index.

$5^{th}$ Cherry picks the optimal solution using checkmate combination independent variables finds the Optimal Pyramid with the final destination.

Final clarification when independent variables are eliminated from further calculation they create higher tiered Informational Pyramid Structure objects as the informational certainty improves as follows:

a. Each Search Strategy eliminates the geometric growth of the Internet and binds a vague search into a Join Pyramid that maps a relevant environment with 1 billion pages.
  b. The primary independent variable (I) changes the vague search into a concise search and creates the Simple Pyramid that maps an improved environment with the top 1,000,000 web pages.
  c. The secondary independent variable (J) changes the concise search into a precise search and creates the Hybrid Pyramid that maps an optimal environment with the top 10,000 web pages.

d. The tertiary independent variable (K) changes the precise search into an optimal search and creates the Complex Pyramid that maps an optimal solution with the top 100 web pages.
e. The Simple Pyramid filters exclusively the relevant environment with the primary independent variable (I) and thus the Superset(I) mathematical notation. The Internet absent of (I) relevant to the search.
f. The Hybrid Pyramid filters exclusively the improved environment with secondary independent variable (J) and thus the Set(I, J) mathematical notation. The Internet absent of (I, J) relevant to the search.
g. The Complex Pyramid filters exclusively the optimal environment with tertiary independent variable (K) and thus the Subset(I, J, K) mathematical notation. The Internet absent of (I, J, K) relevant to the search.
h. $1^{st}$ Simple Pyramid mapped the improved environment and expands the mathematical Glyph equation by adding the $1^{st}$ key featured associations. $2^{nd}$: Hybrid Pyramid mapped the optimal environment and expands the mathematical Glyph equation by adding the $2^{nd}$ key featured associations. $3^{rd}$: Complex Pyramid mapped the optimal solution and expands the mathematical Glyph equation by adding the $3^{rd}$ key featured associations.
i. The 'Cherry Picking' process uses the checkmate combination variables to find the final destination by using the inductive reasoning popularity score and the deductive reasoning actual content score.
j. The final destination and top (n) pages are sent to the end user's browser as output.

BRIEF SUMMARY OF THE INVENTION

In a nutshell, existing Boolean algebra search engines 100 mimics inductive reasoning Watson like criminal investigation methods for finding the best results 199, whereas the HIVE 200 solves for the optimal answer using Sherlock Holmes deductive reasoning approach to decipher the content of each page to find the final destination 299 within the best results 199.

Internet environment must be organized by the HIVE 200 supercomputer. The Optimizer system 300 is the client side of the architecture and behaves in the same manner as traditional browser that is able to identify interactive input and upon detecting a new keyword or term cluster creates or updates via the Search Pattern Module 310 which is immediately displayed on the end user's browser. Then it maps and plots keywords and assigns them to [L] left or [R] right side of the brain.

The [L] left side of the brain consists of a managerial hierarchical relationship dataset, hereinafter referred to as the Dataset Module 350, which is used to statistically shrink the environment. The [R] right side of the brain is the secondary method of shrinking the environment by using geospatial information. Each time the Optimizer system 300 detects a significant change the Dataset Module 350 updates Search Pattern Module 310. The Shopping Cart system 400 interacts with the user via the Assist Module 410 that facilitates a list of assist input command instructions that refine the interactive input. Furthermore, the Human Brain Module 450 upon detecting commercial keywords inserts smart input and the corresponding GPS information. Finally, the Human Brain Module 450 facilitates a list of TQM personal input command instruction 81-85 that eliminate the confounding elements of the search process.

The Optimizer 300 and Shopping Cart 400 systems, continuously measures the interactive input and will show a (+), (++), (+++) or its graphical equivalent to notify by how much can the Assist Module 410, can improve the search. (+) denote independent variables. When the Shopping Cart 400 figures out a direct request it will display a (++++++) or its graphical equivalent to inform the user the final destination 299 was found. The Human Brain Module 450 is designed to find the final destination 299. This is done before, now, or after a search 150 or direct search 250 is executed when the user is interacting with the Search Engine Optimizer system 1000 to improve the search.

The Optimizer systems 300 has the Data Mining Module 500 that "Cherry Picks" the best results 199, and then dynamically updates the Dataset Module 350, while randomly surfing the web. The Shopping Cart system 400 upon obtaining from the Human Brain Module 450 a direct search (++++++) command instruction that yields the final destination 299, facilitates the Sales Module 700 that puts buyers and sellers together.

BRIEF DESCRIPTION OF THE DRAWINGS

Various exemplary embodiments of this disclosure will be described in detail with reference to the following figures, wherein like numerals reference like elements, and wherein:

FIGS. 9A-9D present an exemplary Assist Module diagram that measures accuracy based on command instructions;

FIGS. 10A-10D present an exemplary Assist Module diagram that builds assisted input;

FIGS. 11A-11D present an exemplary Human Brain Module diagram that measures accuracy based on command instructions;

FIGS. 12A-12D present an exemplary Human Brain Module diagram that measures accuracy based on input;

FIGS. 13A-13D present an exemplary Human Brain Module diagram that interactively builds input;

FIGS. 14A-14D present another exemplary Human Brain Module diagram that interactively builds input;

FIGS. 16A-16D present an exemplary Shopping Cart system that measures the accuracy of smart input;

FIGS. 17A-17D present exemplary Shopping Cart system that measures the accuracy of personal input;

FIGS. 18A-18D present another exemplary Shopping Cart system that measures the accuracy of personal input;

DETAILED DESCRIPTION OF EMBODIMENTS

Figure 1:
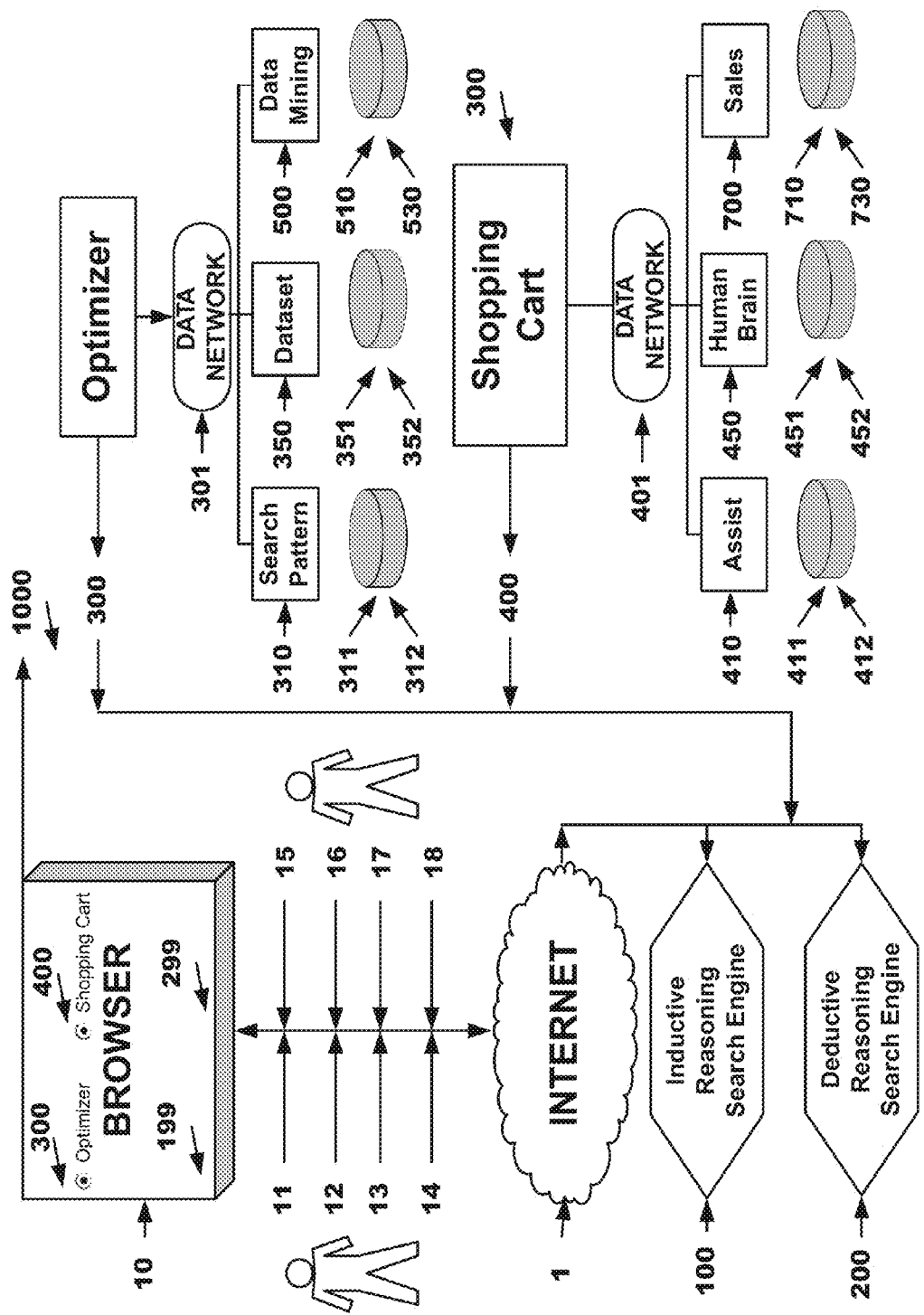
FIG. 1 presents an exemplary Search Engine Optimizer system.

FIG. 1 shows an exemplary Search Engine Optimizer 1000 system using the Internet 1 comprising of an Optimizer 300 and a Shopping Cart 400 system working in parallel that includes terminals 11-18 computers, inductive reasoning 100, and deductive reasoning 200 search engines, computer networks 301 and 401. The Optimizer system 300 has a Computer Network 301 consisting of Search Pattern 310, Dataset 350, Data Mining 500 modules, with databases 311, 312, 351, 352, 510, and 530. The Shopping Cart system 400 has a Computer Network 401 consisting of Assist 410, Human Brain 450, and Sales 700 modules, with databases 411, 412, 451, 452, 710, and 730.

As used herein, the term "module" is intended to include one or more computers configured to execute one or more software programs configured to perform one or more functions. As used herein, the term "computer" is intended to include any data processing device, such as a desktop computer, a laptop computer, a mainframe computer, a parallel cluster supercomputer, a server, a hand held device, or any such device able to process data. The aforementioned components of the Search Engine Optimizer system 1000 represent computer hardware and/or computer-implemented software configured to perform the function described in detail within below. The components of the Search Engine Optimizer system 1000 may be implemented on one or more communicatively connected computers. The term "communicatively connected" is intended to include, but is not limited to, any type of connection, whether wired or wireless, in which data may be communicated, including, for example, a connection between devices and/or programs within a single computer or between devices and/or programs on separate computers.

As used herein, the term "inductive reasoning" Search Engine 100 is intended to include any search engine supercomputer that ranks and measure the popularity score of each Site and Page belonging to Internet 1 and performs "static searches" while users randomly surf the web. As used herein, the term "static search" is intended to include a single search, whereas the term "dynamic search" comprises one or more searches belonging to a session. "Static searches" use Glyphs, and "Dynamic Searches" use Super Glyphs. The term "Glyph" comprises the statistical vector components of a valid keyword and/or clusters that are used to identify relevant pages. The term cluster is a combination of two or more words that placed in an exact order have a significant meaning E g "American", "Of", "States" and "United" is best known for the cluster "United States of America". The term "Super Glyph" is applied to Glyphs that are gain factored when using the Hot/Cold, Likelihood and Relevancy analyses of the incorporated references.

As used herein, the term "deductive reasoning" Search Engine 200 is a method for simulating the entire potential valid interactive input 10 regular expressions construed during an Internet browser search, converting the results sets into Environmental Summary reports object that enables efficient and accurate searching. Furthermore, uses index relationships to eliminate pages from the search process, and dependent and complement variable to gain factors relevancy. Finally, mimicking the Human Brain, linguistic Glyphs are assigned to the [L] left side and geospatial Glyphs are assigned to the [R] right side of the brain and the Anchor is the best common denominator Glyph that is used as the primary index relationship.

The Optimizer 300 is communicatively connected to a Browser 10 by users 11-18 while they are performing a web search. The Search Pattern Module 310 scans, distills and converts interactive input during a web search into keywords and term clusters that are then transformed into vector Glyphs. The Dataset Module 350 arranges, analyzes, and prioritizes Glyphs into a managerial hierarchical relationship, and uses Hot/Cold, Likelihood and Relevancy analyses to create a mathematical equation that optimally shrinks the environment. The Data Mining Module 500 reads and measures each page and then gain factors matches of the Search Pattern and key featured associations by document, paragraph and sentence to figure out the final weighted value. The Optimizer System 300 Cherry Picks the best pages 199 with the highest final weighted value.

The Shopping Cart System 400 is communicatively connected to a Browser 10 by users 11 to 18 while they are performing a web search. The Assist Module 410 interactively facilitates a list of assisted input 80 command instructions with valid keywords and term clusters that simplifies building a search, and can serves as a bona fide spellchecker when encountering a misspelled word within the input. The Human Brain Module 450 uses Hot/Cold, Likelihood and Relevancy analyses to identify key featured associations. Then measures the relevant partition of the Internet 1 with the optimal equation and figures out the final destination 299. The Sales Module 700 performs financial transactions using X_FOB 710 and Y_CDIF 730 methods.

In operation of the Search Engine Optimizer system 1000, a user at the terminal 11 may input a search request using the browser 10. The search request consists of interactive input 10 created or assisted input 80 copied from existing document by the user. Having received the search request from the browser 10, the terminal 11 may communicate with the Search Engine Optimizer system 1000 via the Internet 1 to search using the Optimizer system 300 in accordance with the search request. For example, for each search request, the Search Pattern Module 310 and Dataset Module 350 create a mathematical equation using a managerial hierarchical index relationship that optimally shrinks the environment. Allowing the Search Engine Optimizer system 1000 to search the databases 311-352 via the data network 301 and retrieve search results. The Data Mining Module 500 analyzes the search results obtained from Search Engines 100 and 200, and perform the process of "Cherry Picking" the best responses 199. The output display is a formatted object that may be a graphical representation of the search request that is capable of being adjusted and modified by a user and by the Search Engine Optimizer system 1000, and will be described in greater detail below. The Search Engine Optimizer system 1000 then communicates with the terminals 11-18 via the browser 10 to display the output.

In operation of the Search Engine Optimizer system 1000, a user at the terminal 11 may input a search request using the browser 10. The search request consists of interactive input 10 created or assisted input 80 copied from existing document by the user, or the voice text equivalent obtained from smart input 90 technologies. Having received the search request from the browser 10, the terminal 11 may communicate with the Search Engine Optimizer system 1000 via the Internet 1 to search using the Shopping Cart system 400 in accordance with the search request. For example, for each search request, the Shopping Cart system 400 uses the Assist Module 410 to identify assisted input that in turn is converted into a mathematical equation that optimally shrinks the environment. The Human Brain Module 450 creates the managerial index relationship that allows the Search Engine Optimizer system 1000 to search the databases 411-452 via the data network 401 and retrieve search results. The Sale Module 700 analyzes the search results obtained from Search Engines 100 and 200, and finds the final destination 199. Using the X_FOB method 710 that considers each page of the Internet a no cost In hand inventory the Search Engine Optimizer system 1000 then communicates with the terminal 11 via the 10 to display the output as well as the retrieved search results to the user. Alternatively, puts buyers and seller together using the Y_CDIF method 730 and performs a financial transaction.

The Search Engine Optimizer system 1000 may also provide suggestions assisted input 80 and smart input 90 command instructions to the user to refine the 350 Dataset. For example, the Search Engine Optimizer system 1000 may use the Data Mining Module 500 to analyze the search results and Sales Module 700 using smart input GPS coordinates to interact with the user to obtain command instructions that eliminates confounding variables to create an improved Dataset 350. The improved Dataset 350 and corresponding statistical information becomes the output object that is displayed on the user's browser 10.

It should be understood that responsive to the interactive input, the terminal 11 may send the changes to the Search Engine Optimizer system 1000, repeatedly until the user is satisfied with the search results.

Responsive to the interactive input the terminal 11 upon determining the user's intent to perform a financial transaction the Search Engine Optimizer system 1000, puts buyers and sellers together using X_FOB 710 and Y_CDIF 730 methods incorporated by reference.

Figure 2:
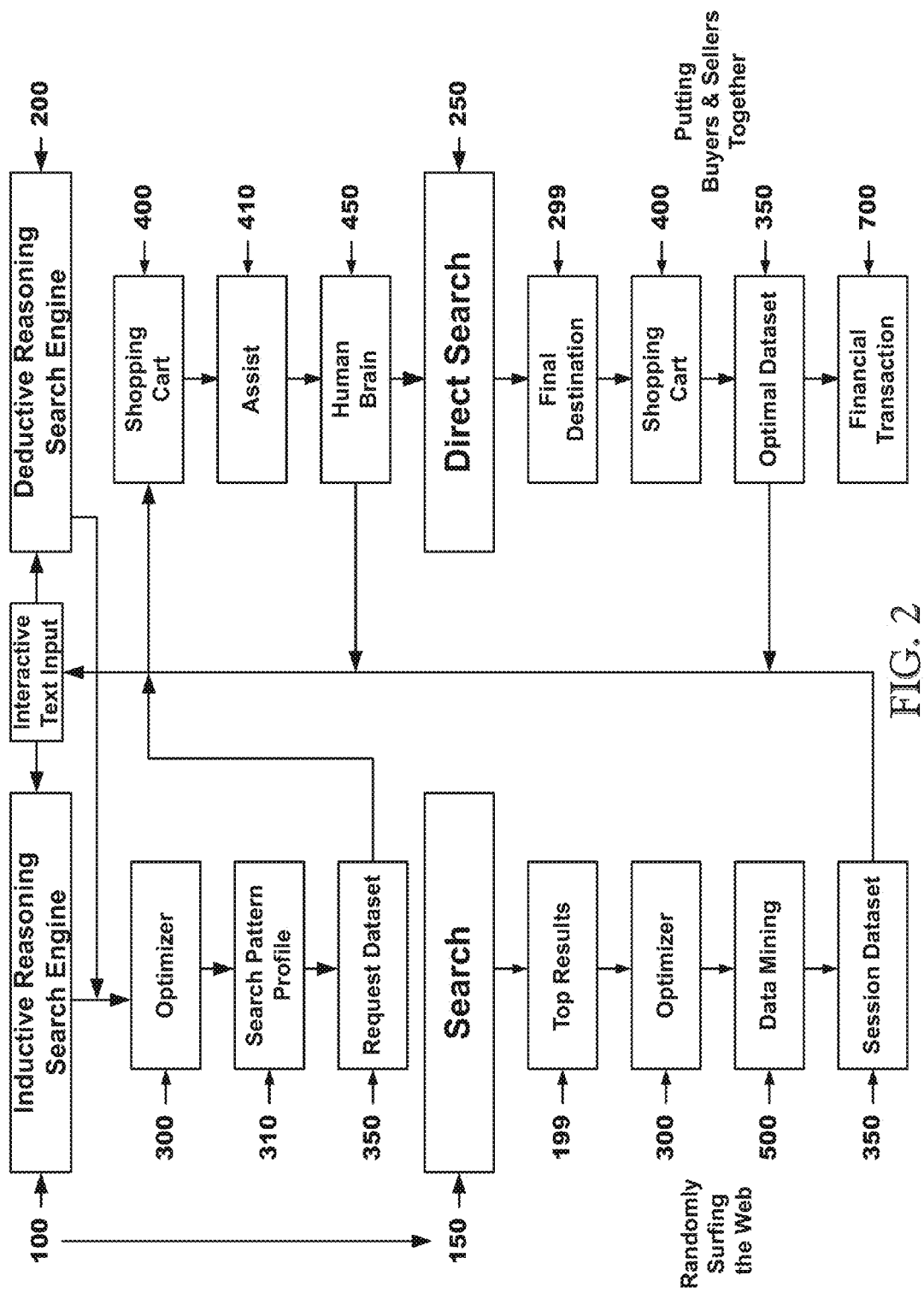
FIG. 2 presents a flow diagram outlining an exemplary process for the Search Engine Optimizer system.

FIG. 2 is a flow diagram outlining an exemplary process of the Search Engine Optimizer system 1000 working with an inductive reasoning Search Engine 100, (e.g. Bing, Google or Yahoo) and/or Deductive Reasoning Search Engine 200, (e.g. XCommerce). The Optimizer system 300, helps a user using an inductive reasoning Search Engine 100 to interactively build a search request. The search request is broken up into keywords and clusters that are converted into Glyphs. The Optimizer system 300 creates a Search Pattern profile 310 based on the interactive input entered by the user. The Search Pattern profile 310 is a mathematical equation representation of the interactive input entered by the user. The Search Pattern profile 310 is converted into a Request Dataset 350. The Request Dataset 350 is a managerial hierarchical relationship index to shrink the environment optimally using the independent variables to eliminate pages and the dependent and complement variables also known as key featured association to gain factor relevant pages The Optimizer system 300, can also help a user using a deductive reasoning Search Engine 200 to interactively build a search request. Upon detecting changes in the interactive input the Shopping Cart system 400, is made available with a list of assisted and smart input command instructions. In this way, assisted input command instructions are readily available to begin a request. The Search Engine Optimizer system 1000 will search in its database for assisted input 80 and smart input 90 command instructions. In this case, Assist Module 410 displays a list of valid Glyph that will serve as the basis of the search. This permits the end user to type . . . Am, and selects from the valid list of Glyphs "American" and then to continue by typing C and from the list of valid Glyphs selects "American Civil War". The assisted input 80 "American Civil War" becomes text input.

E.g. Assist Module converts the commercial Glyph Walmart and incorporates the user's IP Address or GPS coordinates to create smart input 90. The smart input 90 Walmart becomes text input.

At any time the end user can click on the Shopping Cart graphical display and instantiate the Human Brain module 450, to help the end user using the latest Request Dataset 350 to create new set of command instructions that improve the accuracy and precision of the Search Engine Optimizer system 1000. The accepted end user's instructions yield: Search 150 or Direct Search 250.

The Search 150 is sent to either an inductive reasoning 100 or deductive reasoning 200 Search engine, and the top results 199 are displayed on the end user's terminal. The Optimizer system 300 uses the Data Mining Module 500 to analyze the top results 199 and creates a Session Dataset 350 with dynamic instead of statics values Glyphs, since the first request failed to reach the final destination 299. This iterative process of randomly surfing the web may be repeated until the user is satisfied with the top results 199 that now becomes the final destination 299 and stops requiring further refinement.

The Direct Search 250 bypasses randomly surfing the web process and maps the final destination 299 for a final decision. Now that we have input that precisely plots output we need to know what the user really wants. The Financial Transaction Module 700 can now perform X_FOB, a free of cost Inventory In hand, financial transaction by furnishing the checkmate combination information the user wants, e.g. the Address Information, Telephone and Directions to a Business location. In addition once the final destination 299 is found the Shopping Cart 400 becomes a traditional cart using the Financial Transaction Module 700 and based on the user's approved instructions puts buyer (user) and seller (best priced supplier) together and performs a Y_CDIF transaction. Note: free downloads are considered X_FOB financial transactions since they are considered free of cost Inventory In Hand.

Figure 3:
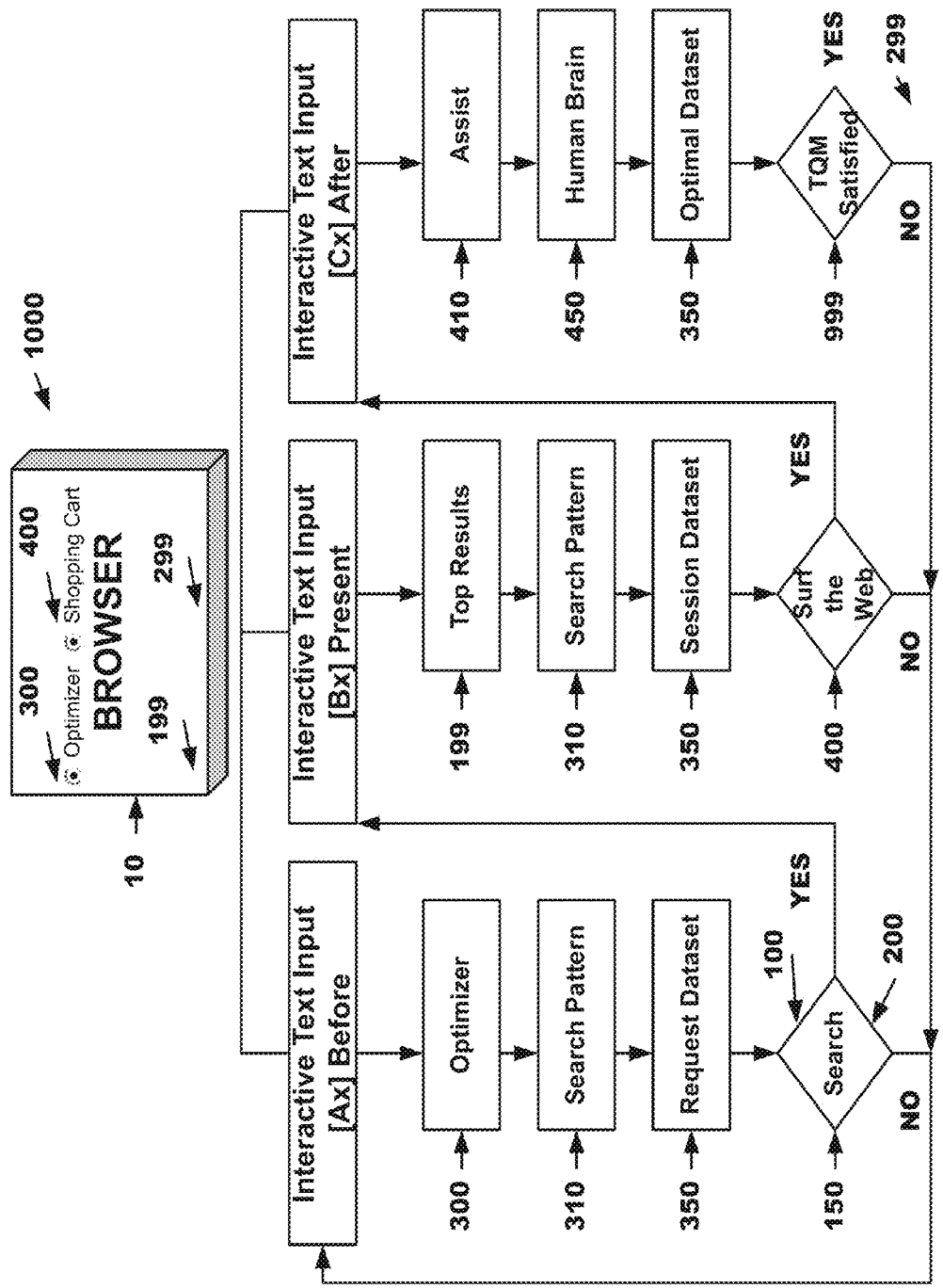
FIG. 3 presents an exemplary block diagram of the Optimizer subsystem.

FIG. 3 is a flow diagram outlining an exemplary process of the Search Engine Optimizer 1000, interacting with a user using a browser 10 in real time. Interactive analysis means at incipiency. In this case, the Optimizer 300 and Shopping Cart 400 systems are continuously analyzing output and translating the information into the computerized version of the Mayan Cholti language, that uses the [L] left and [R] right side of the brain to break down an idea. First: we must analyze the tense of the analysis of the interactive text analysis, and assign accuracy limits. [Ax] represents any analysis before the Search command instruction is sent to a 100 or 200 Search Engine, and the accuracy is the lowest since it is an estimate. [Bx] represents a second analysis that is automatically, performed once a Search Engine 100 or 200 responds with the top results 199. [Cx] represents a post factum analysis that is performed by the Human Brain module 450, to identify additional key features associations. Thus, [Ax] is before, [Bx] is present, and [Cx] is after interactive input that solves for the top results 199. The [Dx] represents the personal input that is the new features to the cross references related applications. The [Dx] Cherry Picking process mirrors what Sir. Isaac Newton did by assigning limits such as zero and infinity when developing modern calculus to improve Euclidian geometry and later the quantum physics advancements Albert Einstein did for non-Euclidean geometries in particular the theory of general relativity.

To reach 100% precision, we must remove the confounding components of the search, these are assumptions that search engines 100 and 200 do not take into account, these assumptions are based on Total Quality Management levels of customer satisfaction, and thus require the system to ask and obtain confirmation command instruction, to solve for Direct Searches that yield the final destination 299. What is new for the Search Engine Optimizer system 1000, consists of the Shopping Cart system 400 functions that permit during the [Ax] before, [Bx] present, and [Cx] after to eliminate the confounding variables of the search process, that will permit to solve for the final destination 299. Based on the tense the search process has implicit confounding variables: [Ax] before has at least 3, [Bx] present has at least 2 and [Cx] after has at least 1 confounding variables and thus Table 7 applies.

TABLE 7

Precision limits by input type

| | |
|---|---|
| [Ax] | interactive input: 2 indices with 86% accuracy and 1 million pages. |
| [Bx] | assisted input: 3 indices with 95% accuracy and 10,000 pages. |
| [Cx] | smart input: 4 indices with 99% accuracy and 100 pages. |
| [Dx] | personal input: 6 indices with 100% accuracy and 1 page. |

[Ax] Before: The Optimizer system 300 scans the browser's interactive input 10, and the Search Pattern Module 310 breaks the input into keywords and optimally into term clusters that are transformed into Glyphs that are then arranged in a managerial hierarchical manner upon identify the independent variables within a request that will be used to create a Request Dataset 350. This process is done until the end user performs a Search command instruction 150 that sends the interactive input to a Search Engine 100 or 200.

[Bx] Present: The Optimizer system 300 now scans the Top Results 199, and the Search Pattern Module 310, analyzes each page to find key featured associations and the best fit paragraph content and dynamically calculates, prioritizes, arranges and find missing gaps of information within the Search Pattern that will be used to create a Session Data 350. The static Glyphs become dynamic Super Glyphs and the interactive input 10 becomes assisted input 80, since the Search Engine Optimizer system 1000 will analyze at least one request belonging to a session. At this point the end user can quit the search, or use the Shopping Cart system 400.

[Cx] After: A NO command instruction means the user will continue to randomly surf the web and a YES activates the Assist Module 410 that interact with the Human Brain Module 450 triggering Total Quality Management customer satisfaction command instructions feedback that eliminates confounding variables and creates the Optimal Dataset 350. If the Optimal Dataset 350 has NO checkmate combination that yields the final destination 299 the user continues randomly surfing the web the assisted input 80 becomes smart input 90. If YES the smart input 90 becomes personal input 99 and the user is TQM Satisfied 999.

Hereinafter, TQM command instructions will now become independent variables that will be used by to solve for the final destination and thus interactive text input will no longer consist of text and analysis of the top results 199, but will include decisions that eliminate confounding elements of the search process.

Figure 4:
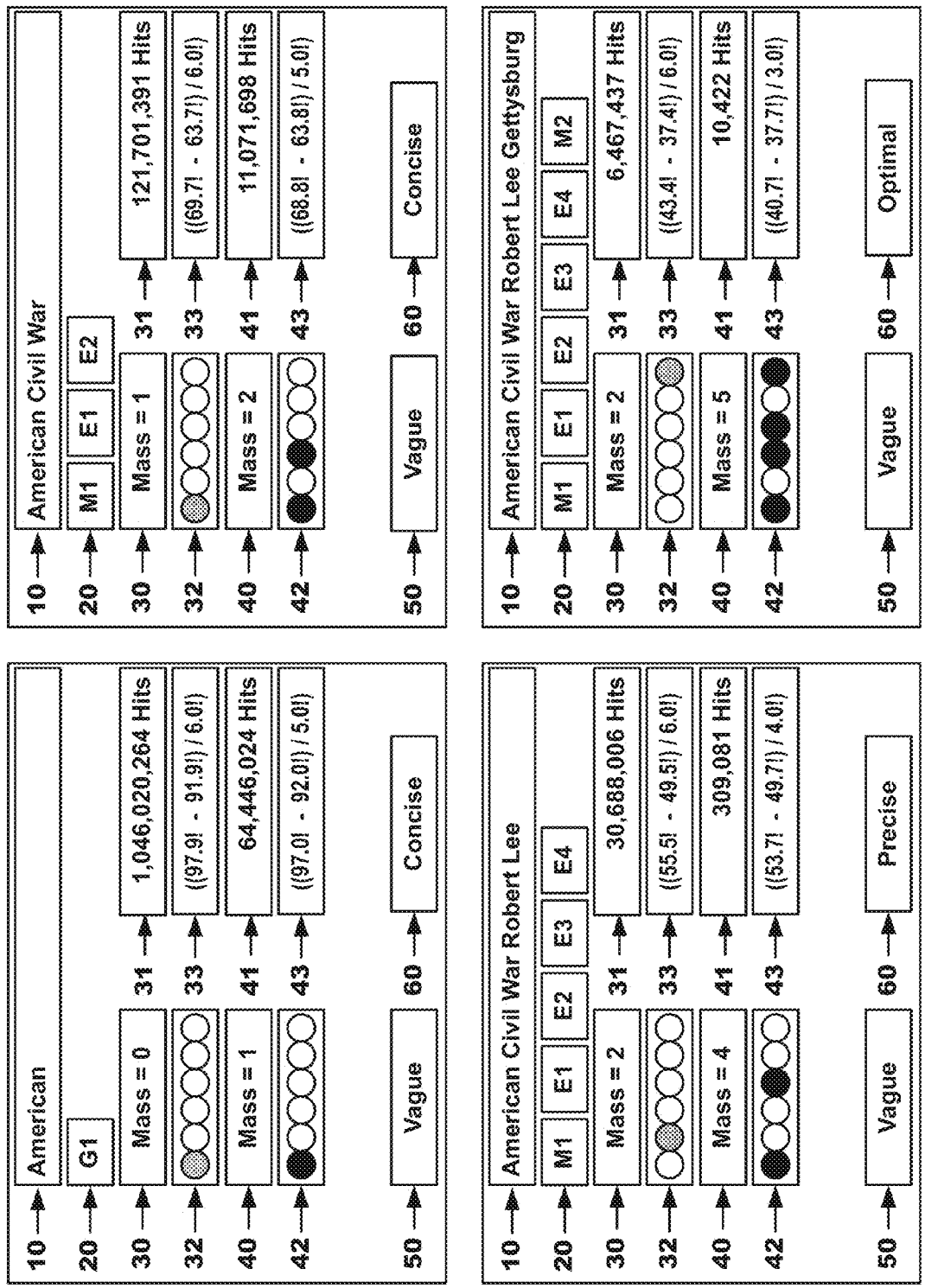
FIG. 4 presents an exemplary Search Engine Optimizer system interacting with user via a browser.
Figure 5:
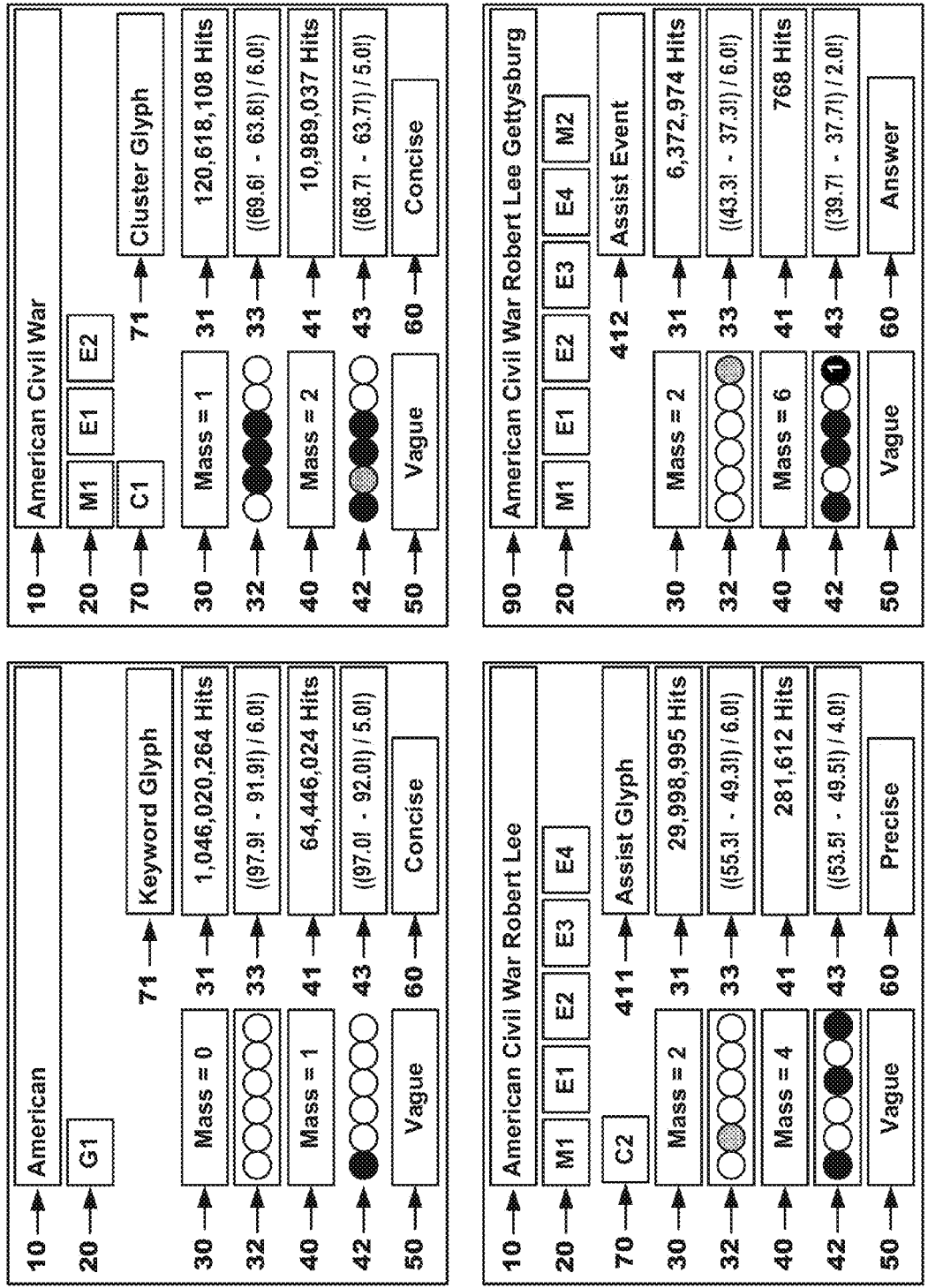
FIG. 5 presents another exemplary Search Engine Optimizer system interacting with user via a browser.
Figure 6:
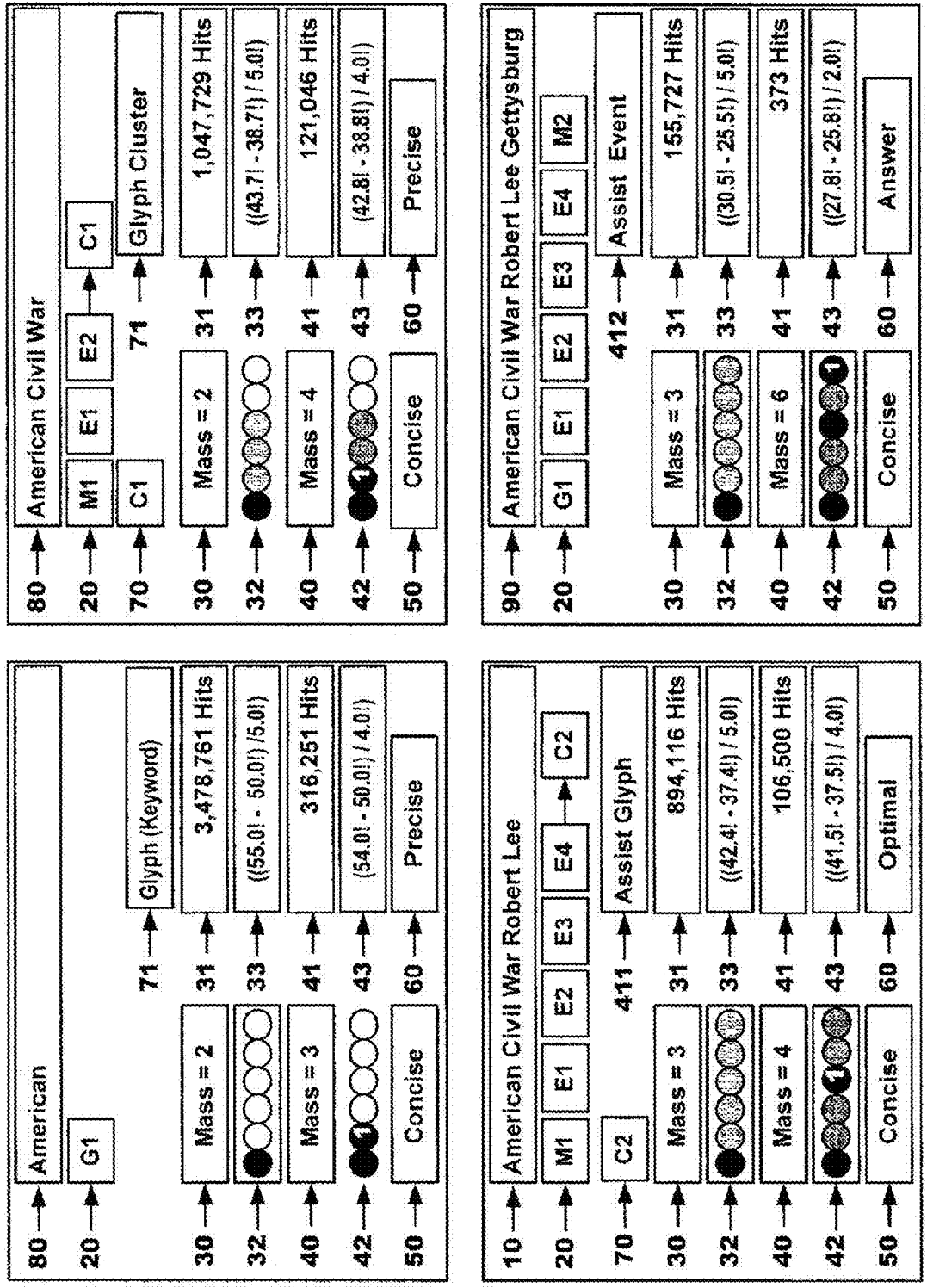
FIG. 6 presents another exemplary Search Engine Optimizer system interacting with user via a browser.

The evolution of the Search Engine Optimizer system 1000, where FIG. 4 reflects the flow of the original reference application, FIG. 5 its continuation and FIG. 6 the new stuff. Each of these figure interact with a browser 10 and the user discretion through assisted input 80 that store and display the interactive text input of an user while directly and/or randomly surfing the web. Each keyword and cluster term is converted into a Glyph 20, where the first letter the side of the brain that is preferably used when solving for a solution. E denotes English language based and is used by the left side of the brain, G denotes geospatial and is used by the right side of the brain, and M denotes Mixed and can be used by both sides of the brain, and D denotes Total Quality Management decision that eliminate confounding variables of the search process.

Each request is assigned an inductive reasoning mass value 30 that ranges from 0 to 8 (where 8 reflects Certainty, and 0 the Spaghetti Phenomena of chaos and anarchy). Each request is assigned an inductive reasoning estimated environment size value 31 that ranges from 1 to one trillion (where 1 reflects Certainty, whereas and one trillion ($2^{40}$) the Spaghetti Phenomena of chaos and anarchy). Each request is assigned an inductive reasoning Logic Grid 32 and gamma function equation 33. Each request is assigned a deductive reasoning mass value 40 that ranges from 0 to 8 (where 8 reflects Certainty, whereas 0 relevant). Each request is assigned a deductive reasoning estimated environment size value 41 that ranges from 1 to one billion ($2^{30}$) (where 1 reflects Certainty, whereas and one billion what is relevant). Each request is assigned a deductive reasoning Logic Grid 42 and gamma function equation 43.

Using the number of independent variables within a request an inductive reasoning category 50 and a deductive reasoning category 60 are displayed as follows: 0=Vague, 1=Concise, 2=Precise, 3=Optimal and 4=Answer searches. Optimal and Answer searches have at least one probabilistic total quality management command instruction that enables them to exceed the 86% accuracy threshold.

FIGS. 4 through 6 highlight the interactive text input process of a user to create the final request "American Civil War Robert Lee Gettysburg". (A) Start with the user starting the process typing a single keyword in this case "American". (B) The user continues to typing interactive input 10 or uses assisted input 80 to improve the text input to "American Civil War" the term cluster. (C) The user continues to typing in the browser 10 or uses assisted input 80 to improve the text input to "American Civil War Robert Lee" by adding the "Robert Lee" term cluster. (D) The user continues to type interactive input 10 or uses smart input 90 to improve the input to "American Civil War Robert Lee Gettysburg" by adding the geospatial and relevant "Gettysburg" keyword.

Cholti converts the keywords into term clusters 70 that is part of the Search Pattern, where M1+E1+E2 becomes C1 or "American Civil War" and E3+E4 becomes C2 or "Robert Lee". C1 is converted into Assist Glyph 411, that becomes the primary index relationship that should yield the final destination, and thus the final destination will include the assisted input 80 "American Civil War" within its content. During the interactive process the system determines that the two clusters 70 and M2 or "Gettysburg" are directly related. Since, M2 or Gettysburg is geospatial or smart input 90 the system creates an Assist Event 412 or "Battle of Gettysburg", and finds the missing gaps of information and by adding Pennsylvania, Gettysburg GPS coordinates, Jul. 1, 1863 time stamp, order of battle, and historic sites. Now, Cholti uses the smart input 90 to perform the user's search, and if the user wants generic description of the Battle of Gettysburg, the answer will reside in an encyclopedia or high quality content site, otherwise the search will continue and the user will continue to surf the web, until the real purpose of the search is known.

Figure 7:
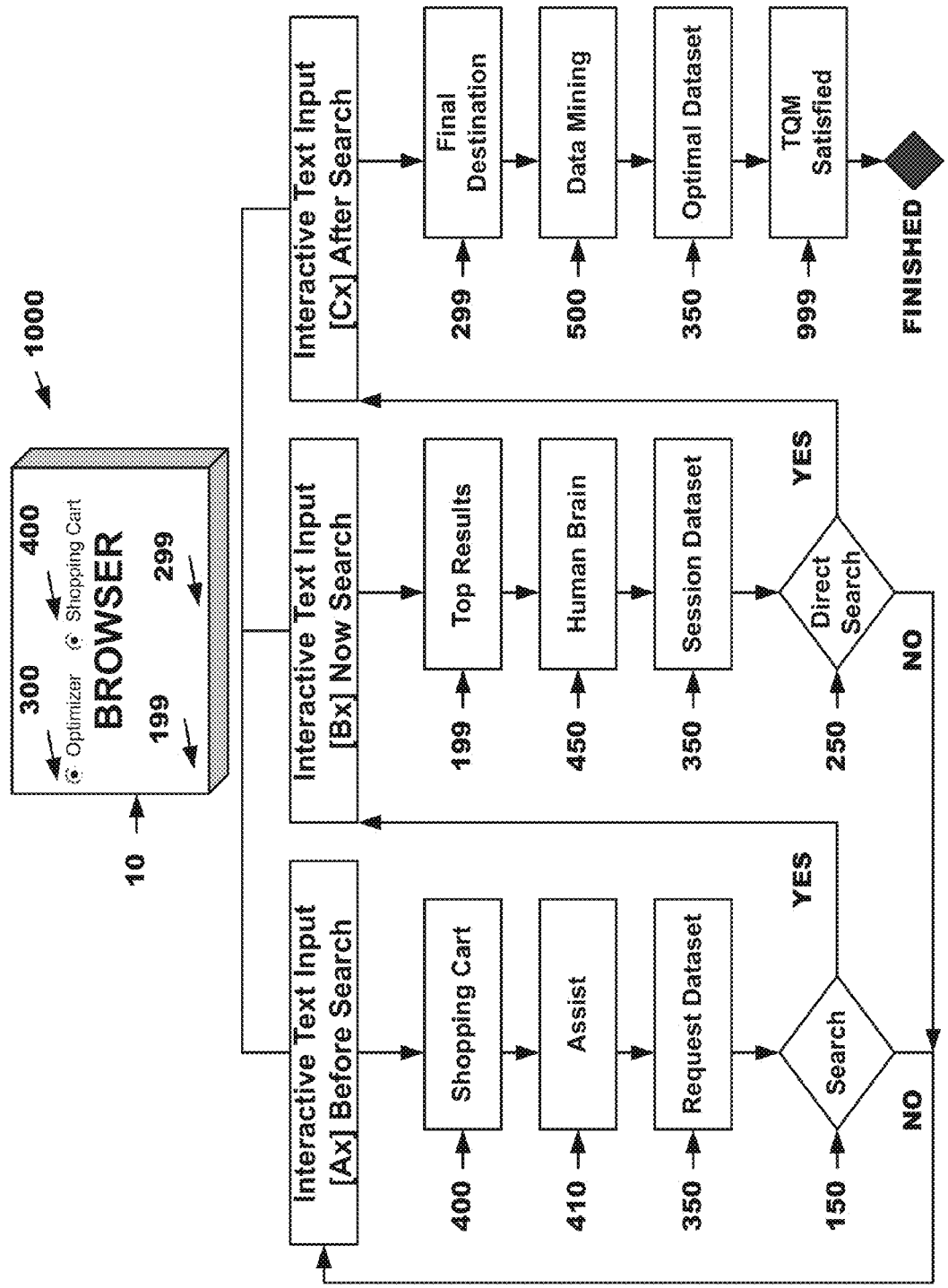
FIG. 7 presents an exemplary block diagram of the Shopping Cart system.

FIG. 7 shows an exemplary block diagram of the Shopping Cart system 400 as the Search Engine Optimizer 1000 gathers the Browser's interactive input 10, while randomly surfing the web. [Ax] before the user selects from a list of assisted input 80 command instruction offered by the Assist Module 410 and then the Optimizer subsystem 300, creates a Request Dataset 350 using the selected command instruction corresponding managerial index relationships. [Bx] now the user command instructs a Search 150, and will receive as output the Top Results 199 and will continue to surf the web, with assistance of the Human Brain Module 450, that will dynamically match/merge at least one request into a session, and create a Session Dataset 350, and will gain factor key featured association based on their frequency and nearness to the managerial index relationships. The Human Brain Module 450 will offer additional keywords and decisions as command instruction to figure out a Direct Request 250 that yields the final destination 299. Each command instruction is accompanied with the content derived from the analysis of the Top Results 199 and the corresponding gained factor value (from 0 bad to 10 optimal) of the Session Dataset 350. Now the Data Mining Module analyzes the final destination 299, since the user no longer need to randomly surf the web. Using the [Cx] after interactive text input creates an Optimal Dataset 350 that also includes the user accepted command instructions, and thus the input now maps and plots the output. The search process is finished and the user is TQM Satisfied 999.

FIGS. 8 through 18 have the following common elements: Glyph conversion 20 of the user interactive text input, and the corresponding Inductive Reasoning Search statistics Mass 30, estimated environment size 31, displayed output logic grid 32, gamma function 33, and accuracy 51 and immediately after the corresponding Deductive Reasoning Search statistics Mass 40, estimated environment size 41, displayed logic grid 42, and gamma function 43 and accuracy 61. By default the Search Engine Optimizer system 1000, updates and displays inductive reasoning statistics logic grid 32 and accuracy 51 as the end user interactively inputs text, and upon detecting a valid Request Dataset 350 and displays deductive reasoning statistics logic grid 42 and accuracy 61. The Search Engine Optimizer system 1000 uses an accuracy algorithm from (0-100.00) based on the Request Dataset 350 and estimated environment size to display 51 and 61 accuracy output as an integer ##% or float ##.## % value format. The system converts keywords into cluster 70, such as M1+E1+E2 into C1 or "American Civil War".

Assist Module 410 decisions are as follows: T1 or 71 represents a keyword or term cluster. T3 or 73 represents an event comprising of two independent variables. T2 or 72 enhances T1 or 71 by having a quality filter to gain factor pages. T4 or 74 enhances T2 or 72 by having quality filter to gain factor pages. T3 or 73 and T4 or 74 from the command instructions of the Assist List 421 figures out and expands the [L] brain and [R] Glyph equations with the feedback Glyphs equation 422 or N1 that attenuates content with confounding variables in order to stabilize and reduces sensitivity parameter variations due to the environment.

Human Brain Module 450 decisions are as follows: D1 or 81 represents a commercial Glyph. D3 or 83 represents a commercial Glyph with default GPS coordinates. D2 or 82 enhances D1 or 81 by having a quality filter to gain factor pages. D4 or 84 enhances D2 or 82 by having quality filter to gain factor pages. T3 or 73 and T4 or 74 from the command instructions of the Assist List 421 figures out and expands the [L] brain and [R] Glyph equations with the feedback Glyphs equation 422 or N1 that attenuates content with confounding variables in order to stabilize and reduces sensitivity parameter variations due to the environment. D5 or 85 is an Exact Decision that creates a Direct Search 250, and yields the Final Destination 299.

FIG. 8 shows an exemplary Assist Module 410 diagram that measures accuracy based on input. In FIG. 8A, the user using assisted input 80 selects an Assist Glyph 411 and the command instruction 71 makes the interactive text input "Napoleon Bonaparte" or C1 that is a cluster 70. In FIG. 8B, the user using Assist Glyph 411 selects a High Quality Glyph 412 and the command instruction 72 makes the text input "Napoleon Bonaparte". In FIG. 8C, the user picks an Assist Event 413 to improve FIG. 8 A by adding "Waterloo" and the command instruction 73 makes the interactive text input "Napoleon Bonaparte Waterloo". In FIG. 8D, the user picks a High Quality Event 414 to improve FIG. 8 B by adding "Waterloo" and the 74 command instruction makes the interactive text input "Napoleon Bonaparte Waterloo".

Figure 8A:
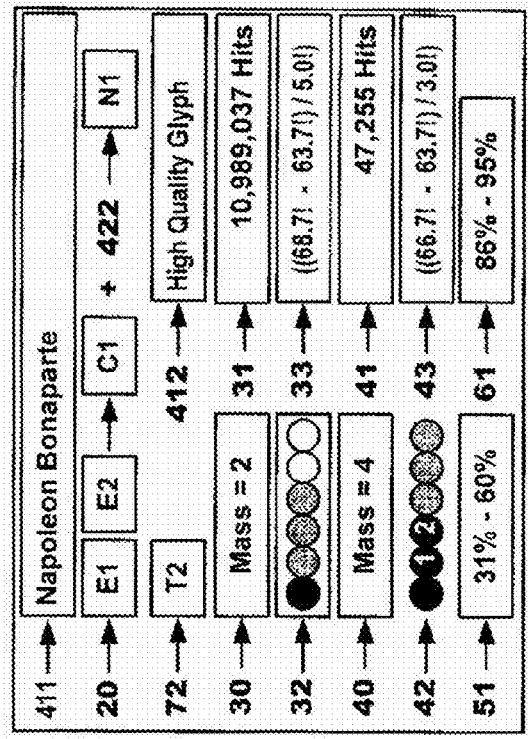
FIGS. 8A-8D present an exemplary Assist Module diagram that measures accuracy based on assist input.
Figure 8B:
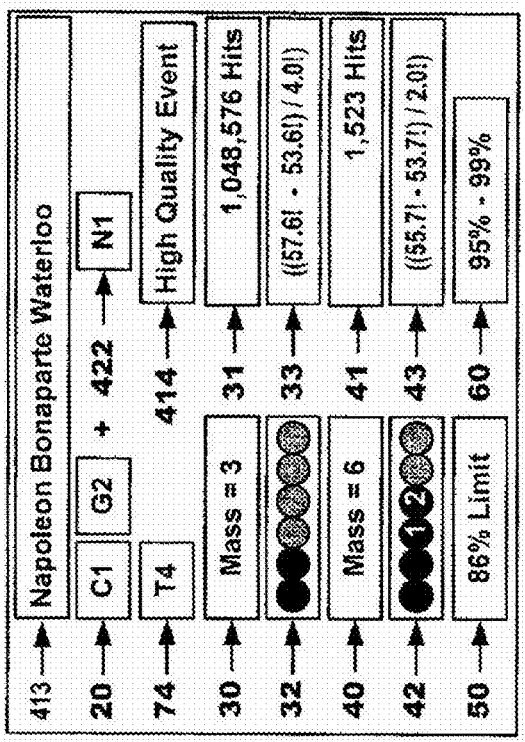
Figure 8C:
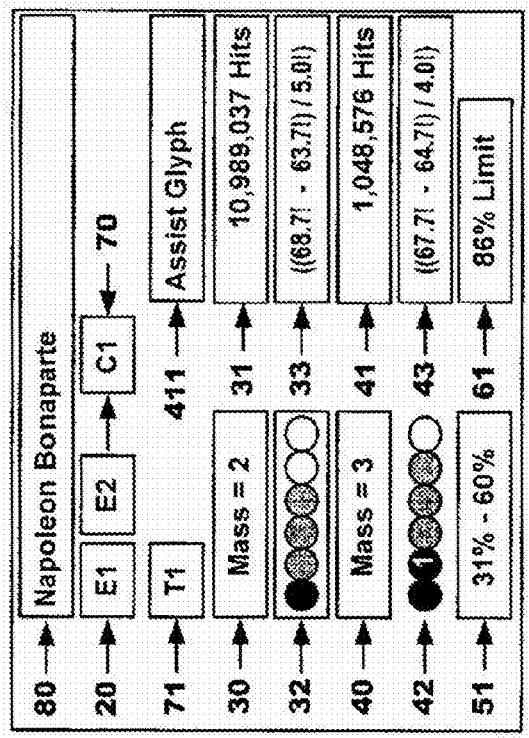
Figure 8D:
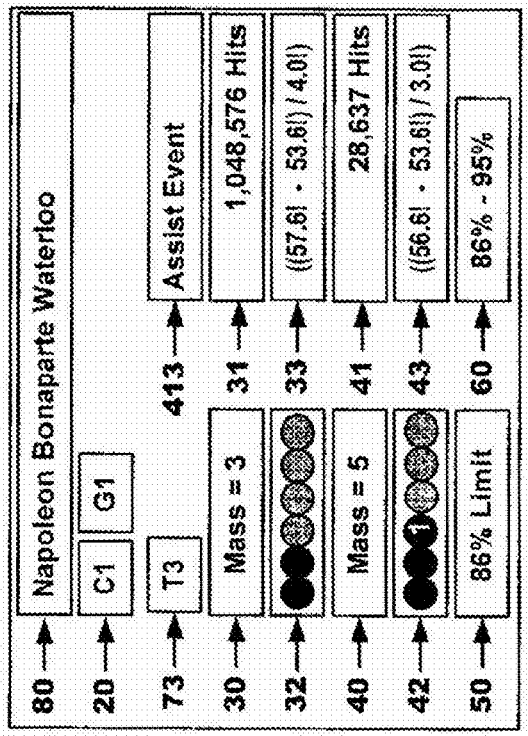

Both FIG. 8C and FIG. 8D use Request Dataset 350 and corresponding managerial index relationships to build the [L] left brain and [R] right brain equations based on the smart input 90 historical event that took place in Waterloo, Belgium on Jun. 15, 1815, and yes Emperor of France Napoleon Bonaparte and Allied Commander Duke of Wellington as well as their chain of command are part of the equation used to gain factor the content of the Top Results 199. FIG. 8 is [Ax] before analysis. Both FIG. 8B and FIG. 8D have feedback Glyphs equation 422 or N1 that attenuates confounding variables when parsing and vectoring content value.

FIG. 9 shows an exemplary Assist Module 410 diagram that measures accuracy based on command instructions. In FIG. 9A, the user using assisted input 80 selects an Assist Glyph 411 and the command instruction 71 makes the interactive text input "Napoleon Bonaparte". In FIG. 9B, the user using Assist List 421 selects an Assist Glyph 411 and the command instruction 71 makes the interactive text input "Napoleon Bonaparte". In FIG. 9C, the user using Assist Glyph 411 selects a High Quality Glyph 412 and the command instruction 72 makes the interactive text input "Napoleon Bonaparte". In FIG. 9D, the user using Assist List 421 selects a High Quality Glyph 412 and the command instruction 72 makes the assisted input 80 "Napoleon Bonaparte". Both FIG. 9C and FIG. 9D have Feedback Glyphs equation 422 that attenuates confounding variables when vectoring content value.

FIG. 10 shows an exemplary Assist Module 410 diagram that interactively builds input. In FIG. 10A, the user using assisted input 80 selects an Assist Event 413 and the command instruction 73 makes the interactive text input "Napoleon Bonaparte Waterloo". In FIG. 10B, the user uses Assist List 421 to correlate "Napoleon Bonaparte" and "Battle of Waterloo" into and Assist Event 413 and the command instruction 73 makes the interactive text input "Napoleon Bonaparte Waterloo". In FIG. 10C, the user using Assist Event 413 selects a High Quality Event 414 and the command instruction 74 makes the smart input 90 "Napoleon Bonaparte Waterloo". In FIG. 10D, the user uses Assist List 421 to correlate "Napoleon Bonaparte" and "Battle of Waterloo" into High Quality Event 414 and the command instruction 74 makes the input "Napoleon Bonaparte". Both FIG. 10C and FIG. 10D have Feedback Glyphs equation 422 that attenuates confounding variables when parsing and vectoring content value. "Napoleon Bonaparte Battle of Waterloo" is valid.

FIG. 11 shows an exemplary Human Brain Module 450 diagram that measures accuracy based on command instructions. In FIG. 11A, the user using assisted input 80 selects Commercial Glyph 451 and the command instruction 81 makes the interactive text input "Walmart". In FIG. 11B, the user using Commercial Glyph 451 selects a High Quality Glyph 452 and the command instruction 82 makes smart input 90 "Walmart". In FIG. 11C, the user picks a Commercial Event 453 to improve FIG. 11A by adding Leg (A) (origin) GPS coordinates and the command instruction 83 makes the interactive text input "Walmart+Leg (A)". In FIG. 11D, the user picks a High Quality Event 454 to improve FIG.

11C by adding Leg (B) (destination) GPS coordinates and command instruction 84 makes smart input 90 "Walmart+ Legs (A+B)".

FIG. 12 shows an exemplary Human Brain Module 450 diagram that measures accuracy based on input. In FIG. 12A, the user using assisted input 80 selects Event 451 and the command instruction 81 makes the interactive text input "American Civil War+C2", where C2 is a valid Key Featured Association. In FIG. 12B, the user using Event 451 selects a Combo Group 452 and the command instruction 82 makes the input "American Civil War+C2+C3", where C3 is a valid Key Featured Association. In FIG. 12C, the user the Combo Group 452 in FIG. 12B by selecting D1 the First Decision 453 and the command instruction 83 makes the input "American Civil War+C2+C3+D1", and D1 is the First Decision 453. In FIG. 11D, the user improves the First Decision 453 in FIG. 11C by selecting D2 the Next Decision 454 and command instruction 84 makes assisted input 80 "American Civil War+C2+C3+D2", and D2 is the Next Decision 454.

FIG. 13 shows an exemplary Human Brain Module 450 diagram that measures input. In FIG. 13A, the user using assisted input 80 selects Commercial Glyph 451 and the command instruction 81 makes the smart input 90 "Walmart", where D1 is a valid Zero Cluster. In FIG. 12B, the user using Commercial Glyph 451 selects a High Quality Commercial Glyph 452 and the command instruction 82 makes the smart input 90 "Walmart". In FIG. 13C, the user picks a Commercial Event 453 to improve FIG. 13B by validating Leg (A) (origin) GPS coordinates and the command instruction 83 makes the smart input 90 "Walmart+Leg (A)". In FIG. 11D, the user picks a High Quality Event 454 to improve FIG. 13C by validating Leg (B) (destination) GPS coordinates and the command instruction 84 makes the smart input 90 "Walmart+Legs (A+B)".

FIG. 14 shows another exemplary Human Brain Module 450 diagram that interactively builds input. In FIG. 14A, the user using assisted input 80 selects Assist Glyph 451 and the command instruction 81 makes the interactive text input "American Civil War+C2", where C2 is a valid Key Featured Association. In FIG. 14B, the user using Assist Event 452 selects a Combo Group and the command instruction 82 makes the text input "American Civil War+C2+C3", where C3 is a valid Key Featured Association. In FIG. 14C, the user using Combo Group 453 selects D1 the First Decision and the command instruction 83 makes the assisted input 80 "American Civil War+C2+C3+D1", and now D1 is the First Decision 453. In FIG. 14D, the user improves the First Decision 453 in FIG. 14C by selecting D2 the Next Decision 454 and the command instruction 84 makes the assisted input 80 "American Civil War+C2+C3+D2", and D2 is the Next Decision 454.

Figures 15A, 15B, 15C, 15D:
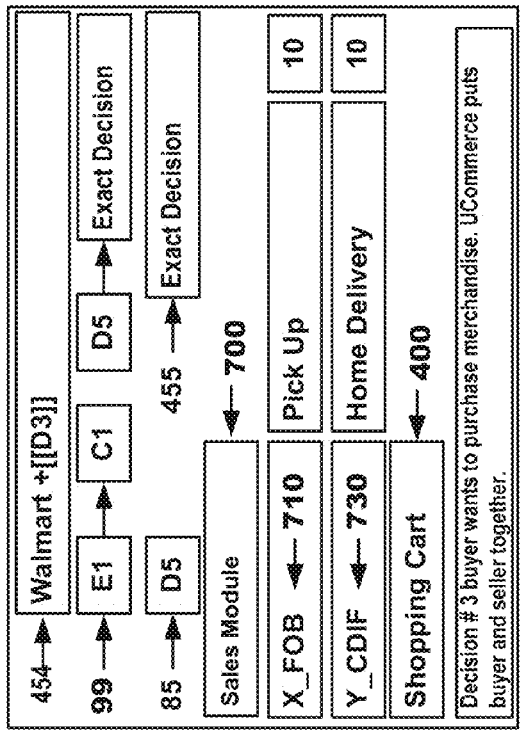
FIGS. 15A-15D present an exemplary Human Brain Module diagram that builds a Direct Search.

FIG. 15 shows an exemplary Human Brain Module diagram that builds a Direct Search. FIG. 15A is a continuation of FIG. 15D, where the user created a High Quality Commercial Event 454 by selecting an Exact Decision 455 and the command instruction 85 makes a Direct Search 210 that yields to the final destination, in this case the personal input 99 has a map with driving directions to a particular store. FIG. 15B is another continuation of FIG. 15D, where the user is linked to the Sales Module 700 enabling X_FOB 710 and Y_CDIF 730 financial transaction methods. FIG. 15C is a continuation of the personal input 99 "American Civil War+C2+C3+D2", where D2 is the Next Decision 454, and C2 and C3 are related key featured associations of the "American Civil War" in this case C2 is Robert Lee, and C3 is the Battle of Gettysburg, and the command instruction 85 makes an Exact Decision 455.

Once the Shopping Cart system 400 creates a Direct Search 210, the Sales Module 700 is activated and enables the X_FOB 710 and Y_CDIF 730 financial transaction methods. In FIG. 15D the user makes a Purchase Decision 456 and the command instruction 86 commercializes with personal input 99 that permits the user to perform a financial transaction. At this point, the search process is over, and the Sales Module 700 puts buyers and sellers together and now behaves as an online shopping cart, since the user performed a Purchase Decision 456. The final destination 299 obtained from the Exact Decision 455 contains the personal input 99 that possess the destination Hotel C geospatial information, and also the user's point of origin, in this case a X_FOB 710 method reservation is offered, or alternatively a Y_CDIF 730 Vacation trip is offered that includes air travel, car rental, insurance and room accommodation information.

FIG. 16 shows an exemplary Shopping Cart system that measures the accuracy of smart input 90. FIG. 16A and FIG. 16C are examples of the user interaction with the Shopping Cart system 400 to obtain an Exact Decision 455 and the command instruction 85 makes a personal input 99 that builds a Direct Search 250. In FIG. 16A in continuation of FIG. 15B the Shopping Cart system 400 transforms the commercial cluster Walmart or C1 into Z1 the Zero Cluster or Walmart-.com. In FIG. 16C the Shopping Cart system 400 transforms the cluster "American Civil War" or C1 into Z1 the Zero Cluster or "American Civil War"+High quality definition. Once, the Shopping Cart obtains personal input 99 with an Exact Decision 85 or D5, the system reaches optimal precision. FIG. 16B measures the accuracy of FIG. 16A, and FIG. 16 D measures the accuracy of FIG. 16C, in both cases the personal input 99 is measured against the final decision 85.

FIG. 16A is based on smart input 90 "Walmart" the Shopping Cart offers a list of options such as Home Page, Location A to Z based on the IP Address, News, and High Quality definition searches with an accuracy of 96% to 99%. Now, to reach certainty the Shopping Cart system 400 obtains the personal input 99 with an exact decision 85 that creates a Direct Search 210 that yields the final destination 299.

FIG. 17 shows exemplary Shopping Cart system measures personal input 99. In FIG. 17A the user using assisted input 80 selects Assist Glyph 451 and the command instruction 81 makes the interactive text input "Walmart", where Walmart is transformed into C1 commercial cluster. When the user selects the Search 150 command instruction, Walmart or C1 is transformed into a Zero Cluster or Z1 for Walmart.com that yields the Top Results 199. Furthermore Zip Code of the IP Address GPS coordinates becomes the smart input 90 point of origin in order to create a map that shows locations prioritized based on distance. FIG. 17B the Search Engine Optimizer system determines that FIG. 17A has two Direct Search 210 paths and analyzes both outcomes. The first Direct Search 210 path, upon receiving the Search 150 command instruction, becomes an inductive reasoning Assist search using Z1 or Walmart.com to figure out the first Final Destination 299. The second Direct Search 210 path, upon receiving the Search 150 command instruction, becomes an inductive reasoning smart input 90 using Zip Code of the GPS coordinates as [R] right brain checkmate equation used to figure out the second Final Destination 299. The first path uses assisted input 80 and yields Walmart.com, and the second path uses smart input 90 and yields Location A. Since, two or more Final Destination 299 exist, one or both of the path are automatically confounding. This is the reason of the present invention is to figure out the personal input 99 using TQM command instruction that identify the true final destination 299.

In FIG. 17C the user using assisted input 80 selects Assist Glyph 451 and the command instruction 81 makes the interactive text input "American Civil War". When the user selects the Search 150 command instruction, the input is sent to a Search Engine and the output displayed becomes the Top Results 199. FIG. 17D the Search Engine Optimizer system determines that FIG. 17C has two Direct Search 210 paths and analyzes both outcomes. The first Direct Search 210 path, upon receiving the Search 150 command instruction, becomes an inductive reasoning assisted input 80 high quality definition using C1 or "American Civil War" to figure out the first Final Destination 299. The second Direct Search 210 path, upon receiving the Search 150 command instruction, becomes an inductive reasoning page rank search using popularity score used to figure out the second Final Destination 299. The first path uses assisted input 80 and yields Encyclopedia A.com, and the second path uses the popularity score yields Site A. Since, two or more Final Destination 299 exist, one or both of the path are automatically confounding. This is the reason of the present invention is to figure out the personal input 99 using TQM command instruction that identify the true final destination 299.

Personal input 99 takes into account the [L] left brain equation (E1 to EN) Key featured associations, and [R] right brain equation (G1 to GN) key featured association, and then gain factors the Top Results 199, and determines that Site B has the best content and is the Final Destination 299. Finally, Site B is further justified by using the deductive reasoning means of the feedback Glyphs equation 422 or N1 that attenuates content with confounding variables in order to stabilize and reduces sensitivity parameter variations due to the environment.

FIG. 18 shows another exemplary Shopping Cart system that measures personal input 99. FIG. 18A shows the user select Walmart that becomes Z1 or "Walmart.com", using smart input 90, Search Engine Optimizer System 1000, determines using the Data Mining Module 500 that confounding elements to the search process exist, and minimally the Leg A or point of origin zip code is required to improve the search. FIG. 18B the user selects personal input 99 that contains an Exact Decision 85, validating Legs (A+B), origin and destination, and yields the final destination 299. Once input maps and directly plots the output the search process is over. Now, the Shopping Cart system 400, offers the Sales Module 700 that puts buyers and sellers together using X_FOB 710 and Y_CDIF 730 means provided a financial transaction is required. By default the lion share of most final destination 199 is free content, address information or mapping instructions and Sales Module 700 is skipped. For the exceptions FIG. 19 and FIG. 20 incorporate the X_FOB 710 and Y_CDIF 730 means to further improve TQM Satisfaction 999.

FIG. 18C shows the user select "American Civil War", using assisted input 80, Search Engine Optimizer System 1000, expands the mathematical equation using the Data Mining Module 500 to drill and find within the content of the Top Results 199, what the user is searching. In this case, a list of command instruction will appear in the user's terminal based on KFA (key featured associations), military leaders, and historical events found within the Top Results 199. Finally, using the Sherlock Holmes versus Watson paradigm the Data Mining Module 500 will use deductive reasoning exclusions that attenuate content with confounding variables in order to stabilize and reduce sensitivity parameter variations due to the environment. Now, we can paraphrase Sherlock Holmes having him say "Elementary my dear Watson, if we eliminate using deductive reasoning the confounding elements of the search, as improbable as it may seem will simplify and elucidate the exact path that yields the final destination 299." FIG. 18D the user use the Data Mining Module 500 to figure out the personal input 99 that elucidates the optimal content and thus using deductive reasoning solves the command instruction 95 or D5 has the Optimal Dataset 350 that yields the final destination 299. Once input maps and directly plots the output the search process is over and is displayed on the user's browser 10.

Figure 19:
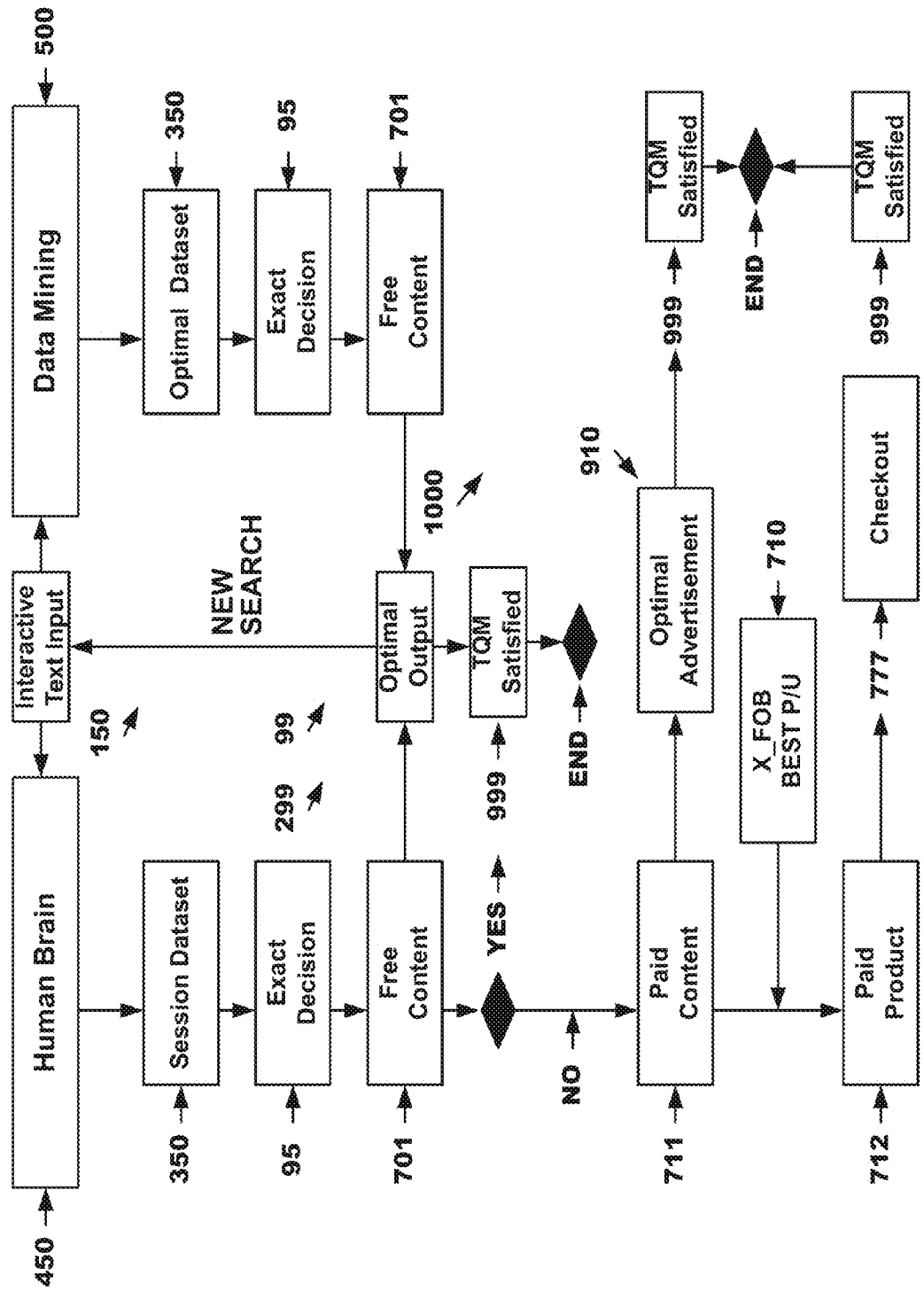
FIG. 19 presents a block flow diagram of the X_FOB method.

FIG. 19 shows a block flow diagram of the X_FOB method. The Human Brain Module 450 and the Data Mining Module 500 after each valid Search 150 command instruction determine corresponding [Bx] now Session Dataset 350, and [Cx] after the Optimal Dataset 350. Both the Human Brain Module 450 and the Data Mining Module 500 interacts with the user until personal input 99 containing an Exact Decision 85 or 95 is encountered that yields the final destination 299. If the final destination is determined to be free content 701, the Search Engine Optimizer system 1000, displays the Optimal Output and the user is TQM Satisfied 999 and the search process either continues with a new search or ends.

When the content is deemed to be a purchase, then Sales Module 700 offers the X_FOB 710, once the system knows the destination of FOB pickup location. When paid content 702 can be provide using the revenues of an Optimal Advertisement 910, the Sales Module 700 will display the advertisement and use the revenues to pay for the viewing of the intellectual property such as a copyrighted video of the user's favorite musical band, once the display is done the user is TQM Satisfied 999 and the search process either continues with a new search or ends.

When the content is a download product purchase, the Sales Module 700 will begin a X_FOB 710 best price/unit search, and perform the financial transaction upon receiving the checkout 777 command instructions the user is TQM Satisfied 999 and the search process either continues with a new search or ends.

Figure 20:
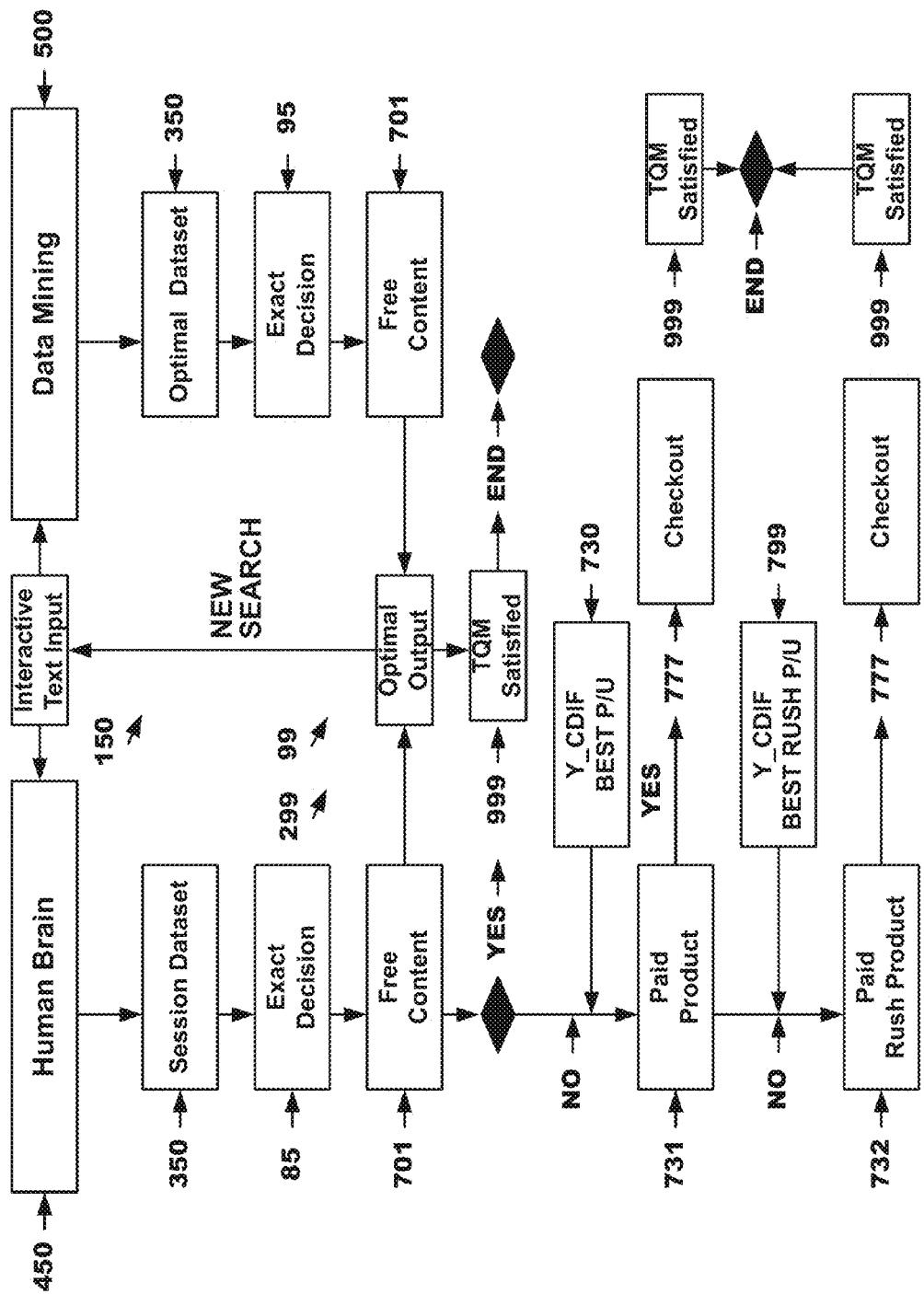
FIG. 20 presents a block flow diagram of the Y_CDIF method.

FIG. 20 shows a block flow diagram of the Y_CDIF method. The Human Brain Module 450 and the Data Mining Module 500 after each valid Search 150 command instruction determine corresponding [Bx] now Session Dataset 350, and [Cx] after the Optimal Dataset 350. Both the Human Brain Module 450 and the Data Mining Module 500 interacts with the user until personal input 99 containing an Exact Decision 85 or 95 is encountered that yields the final destination 299. If the final destination is determined to be free content 701, the Search Engine Optimizer system 1000, displays the Optimal Output and the user is TQM Satisfied 999 and the search process either continues with a new search or ends.

When the content is deemed to be a paid product that requires shipping, insurance, freight, then Sales Module 700 offers the Y_CDIF 730, once the system knows Legs (A+B). The user interacts with Sales Module 700, until the checkout command instruction 777 is received, and the transaction is executed and the user is TQM Satisfied 999 and the search process either continues with a new search or ends.

When the content is deemed to be an emergency paid product and time and not price is the primary variable that requires shipping, insurance, freight, then Sales Module 700 offers RUSH Y_CDIF 799, once the system knows Legs (A+B). The user interacts with Sales Module 700, until the checkout command instruction 777 is received, and the transaction is executed and the user is TQM Satisfied 999 and the search process either continues with a new search or ends.

In conclusion interactive input 10, assisted input 80 and smart input 90 intrinsically have confounding elements that hide the final destination 299. The Hot/Cold, Likelihood and Relevancy analyses figure out key featured association of the mathematical equation that gain factor measured quality of pages and thus improves the precision of the search to 95% accuracy.

To reach 100% accuracy and precision the confounding elements of the search must be eliminated. The optimizer 300 and shopping cart 400 systems allows the user to select personal input 99 containing exact decisions 95 that create Direct Search 250. Each Direct Search 250 uses deductive reasoning means of the feedback Glyphs equation 422 or N1 that attenuates content with confounding variables in order to stabilize and reduces sensitivity parameter variations due to the environment. Direct Searches 250 eliminate the randomly surfing the web trial and error process and in turn automatically yields the final destination 299.

Personal Input 99 allows the process to be commercialized permitting the Shopping Cart system 400 to put buyers and sellers together. At this point, free content and downloads are immediately, sent to the end user as output. Otherwise X_FOB 710 decisions and Y_CDIF 730 are made available to the user.

X_FOB decisions, which measures the FOB price per unit of merchandise being made available through ocean and land transportation means to its physical warehouse originating from participating retailers, wholesalers and suppliers where time is measured in X days dimensions and thus the term X_FOB.

Y_CDIF decisions, which measures the CDIF (cargo duties insurance freight) P/U of forecasted inventory in hand merchandise through air transportation means and door to door services to the end user and time is measured in Y hours dimensions and thus the term Y_CDIF;

The Shopping Cart system 400 storing 'The Price' summary reports and pronounced 'the price' and thus the term Z PRICE, by using X days dimensions X_FOB calculations and Y hour dimension Y_CDIF calculations based on said inventory control of "In Hand" and domestic rush FOB, and also purchasing forecasted inventories lots based on demand, economies of scale, historical trends and storage capacities.

What is claimed is:

1. A method of executing a word search using a computer operating in accordance with a software program,
   providing a software algorithm that mimics the human brain to simulate deductive reasoning, the method comprising steps of:
   (a) creating a language based equation, a geospatial based decision, and a human decision equation to interpret numerical and text data and convert the interpreted data into statistical glyphs objects, wherein each statistical glyphs object is a mathematical equation representative of one of a word or a cluster of words used to determine the optimal partition of the Internet,
   (b) finding missing gaps of information wherein the missing gaps are at least one omitted word from the word search and the at least one omitted word is determined by applying rules of linguistics and semantics to modify the word search to match one or more clusters of words from known statistical glyphs objects,
   (c) dynamically valorizing the weight of each word combination from the entered word search, reorganizing the word search using a human knowledge database, commercializing by assigning a monetary value to each optimal partition of the Internet, and measuring an end user's satisfaction by measuring results of a session based query, and
   (d) hierarchically prioritizes the statistical glyphs objects as a search pattern used to obtain an optimal match in response to an end user valid request;
   assigning a unique value lowest to highest each site and web page;
   organizing the Internet environment into a plurality of Super Blocks;
   distributing each Super Block using a primary index relationship into blocks;
   dividing each block using a secondary index relationship into sub blocks;
   subdividing each sub block using a tertiary index relationship into mini blocks;
   dissecting each mini block into individual elements;
   restricting relevant pages using index relationships;
   probabilistically correlating a plurality of spatial environments into an improved environment;
   scanning and gathering interactive input from an end user's Internet browser to create the word search;
   displaying command instruction that eliminate confounding variables from the word search;
   receiving an instruction from a user for how to modify the word search;
   personalizing the word search in accordance with the decisions from the user executing a set of software instructions to mimic the human brain by finding missing gaps of information, and dynamically valorizing, reorganizing, commercializing, and measuring end user's satisfaction; and
   personalizing the word search in accordance with the instructions from the user.

2. A method of executing a word search using a computer operating in accordance with a software program mimicking the human brain to simulate deductive reasoning to create a language based equation, a geospatial based decision, a human decision equation to interpret numerical and text data and convert the interpreted data into statistical glyphs objects representing the mathematical equation used to determine the optimal partition of the Internet, and then find the missing gaps of information, and which dynamically valorizes, reorganizes, commercializes, measures end user's satisfaction, and hierarchically priorities the Glyphs as a search pattern used to obtain an optimal match in response to an end user valid request, and then displays command instructions that eliminate confounding variables to modify the search pattern in accordance with the instructions from the end user, the method comprising steps of:
   assigning a unique value lowest to highest each site and web page;
   organizing the Internet environment into a plurality of Super Blocks;
   distributing each Super Block using a primary index relationship into blocks;
   dividing each block using a secondary index relationship into sub blocks;
   subdividing each sub block using a tertiary index relationship into mini blocks;
   dissecting each mini block into individual elements;
   restricting relevant pages using index relationships;
   probabilistically correlating a plurality of spatial environments into an improved environment;
   scanning and gathering interactive input from an end user's Internet browser to create a word search;
   displaying command instruction that eliminate confounding variables from the word search;
   receiving an instruction from a user for how to modify the word search;

personalizing the word search in accordance with the instructions from the user;

processing the impact the word search to create an equation that substantially shrinks the size of the search environment by purifying the search process by using at least one index relationship; and assigning to the word search a dominant tendency of a brain and an anchor glyph that yields the destination; synergistically combining for the request the dominant tendency of the brain and the anchor glyph to select a search strategy that creates a managerial hierarchical set.

3. The method according to claim 2, further comprising a step of modifying the word search by:

identifying for the word search the best search pattern within the search pattern database to create a statistical profile that is a statistical representation of the preprocessed calculated results that are sent to the end user's Internet browser as output; and immediately updating with output the end user's Internet browser with statistical information that quantifies and qualifies the precision of a mathematical equation.

4. The method according to claim 3, further comprising steps of:

scanning and gathering assisted input from an the end user's Internet browser to create an assisted search;

displaying command instruction that eliminate confounding variables from the assisted search;

receiving an instruction from a user for how to modify the assisted search; and personalizing the assisted input in accordance with the decisions from the user.

5. The method according to claim 4, further comprising steps of:

processing the impact the assisted search to create an equation that substantially shrinks the size of the search environment by purifying the search process by using at least one index relationship; and assigning to each the assisted search a dominant tendency of the brain and anchor glyph that yields the destination; synergistically combining for the request the dominant tendency of the brain and the anchor glyph to select a search strategy that creates the managerial hierarchical set.

6. The method according to claim 5, further comprising a step of:

modifying the assisted search by:

identifying for the assisted search the best search pattern within the search pattern database to create a statistical profile that is a statistical representation of the preprocessed calculated results that are sent to the end user's browser as output; and immediately updating with output the end user's browser with statistical information that quantifies and qualifies the precision of the mathematical equation.

7. The method according to claim 6, further comprising the steps of:

scanning and gathering smart input from the end user's Internet browser to create a smart search;

displaying command instruction that eliminate confounding variables from the smart search;

receiving an instruction from a user for how to modify the smart search; and personalizing the smart input in accordance with the decisions from the user.

8. The method according to claim 7, further comprising the steps of:

processing the impact the smart search to create an equation that substantially shrinks the size of the search environment by purifying the search process by using at least one index relationship;

assigning to the smart search a dominant tendency of the brain and anchor glyph that yields the destination; and synergistically combining for the request the dominant tendency of the brain and the anchor glyph to select a search strategy that creates the managerial hierarchical set.

9. The method according to claim 8, further comprising the step of:

modifying the smart search by:

identifying for the smart search the best search pattern within the search pattern database to create a statistical profile that is a statistical representation of the preprocessed calculated results that are sent to the end user's browser as output; and immediately updating with output the end user's browser with statistical information that quantifies and qualifies the precision of the mathematical equation.

10. The method according to claim 9, further comprising the steps of:

scanning and gathering personal input from the end user's Internet browser to create a direct search;

displaying command instruction that eliminate confounding variables from the direct search;

receiving an instruction from a user for how to modify the direct search; and optimizing the personalize input in accordance with the decisions from the user.

11. The method according to claim 10, further comprising the steps of:

processing the impact the direct search to create an equation that yields the final destination; and assigning to the direct search a managerial hierarchical set.

12. The method according to claim 11, further comprising the step of:

modifying the direct search by:

creating a statistical profile that is a statistical representation of the preprocessed calculated results that are sent to the end user's browser as output; and immediately updating with output the end user's browser with statistical information that quantifies and qualifies the precision of the mathematical equation.

13. A method of executing a word search using a computer operating in accordance with a software program, providing a software algorithm that mimics the human brain to simulate deductive reasoning by including steps of:

(a) creating a language based equation, a geospatial based decision, and a human decision equation to interpret numerical and text data and convert the interpreted data into statistical glyphs objects, wherein each statistical glyphs object is a mathematical equation representative of one of a word or a cluster of words used to determine the optimal partition of the Internet, (b) finding missing gaps of information wherein the missing gaps are at least one omitted word from the word search and the at least one omitted word is determined by applying rules of linguistics and semantics to modify the word search to match one or more clusters of words from known statistical glyphs objects, (c) dynamically valorizing the weight of each word combination from the entered word search, reorganizing the input using the human knowledge database, commercializing by assigning a monetary value to each optimal partition of the Internet, and measuring an end user's satisfaction by measuring results of a session based query,
(d) hierarchically prioritizes the statistical glyphs objects as a search pattern used to obtain an optimal match in response to an end user valid request;
(e) identifying the search pattern using the Glyph database; and
(f) displaying an optimal match in response to an end user valid request.

14. The method according to claim 13, further comprising a step of:
creating the Glyph database using an indexing refinement process, the indexing refinement process comprising steps of:
(a) assigning a unique value lowest to highest each site and web page;
(b) organizing the Internet environment into a plurality of super blocks;
(c) distributing each Super Block using a primary index relationship into blocks;
(d) dividing each block using a secondary index relationship into sub blocks;
(e) subdividing each sub block using a tertiary index relationship into mini blocks;
(f) dissecting each mini block into individual elements; and
(g) processing the impact of the word search to create an equation that maps an optimal partition of the Internet by purifying the search process using at least one nested index relationship and probabilistically restrict relevant pages.

15. The method according to claim 13, further comprising steps of:
displaying command instruction that eliminate confounding variables from the word search, wherein executing a set of software instructions based on rules of linguistics and semantics using the Glyph database;
receiving an instruction from a user for how to modify the word search; and
personalizing the word search in accordance with the instructions from the user.

16. The method according to claim 13, further comprising steps of:
obtaining Global Positioning System (GPS) coordinates of the present location of the end user's console;
wherein the step of determining and assigning the optimal partition of the Internet uses a nested index relationship of the GPS coordinates to probabilistically restrict relevant pages to map an improved environment; and
employing at least one nested index relationship that yields the destination used to obtain an optimal match to an end user valid request.

* * * * *